United States Patent [19]

Kley et al.

[11] Patent Number: 4,782,327

[45] Date of Patent: Nov. 1, 1988

[54] COMPUTER CONTROL

[75] Inventors: Victor B. Kley, 1119 Park Hill Rd., Berkeley, Calif. 94708; Daniel J. Talken, Quincy, Ill.

[73] Assignee: Victor B. Kley, Berkeley, Calif.

[21] Appl. No.: 688,444

[22] Filed: Jan. 2, 1985

[51] Int. Cl.⁴ .............................................. G06F 3/02
[52] U.S. Cl. .............................. 340/365 P; 340/709; 250/221
[58] Field of Search ............... 340/365 P, 365 R, 709; 250/221; 178/18

[56] References Cited

U.S. PATENT DOCUMENTS

| Re. 30,094 | 9/1979 | Beeck ............................ 340/365 P |
| 3,114,046 | 12/1963 | Cabaniss et al. . |
| 3,515,888 | 6/1970 | Lewis . |
| 3,707,093 | 12/1972 | Worden . |
| 3,748,486 | 7/1973 | Russell . |
| 3,764,813 | 10/1973 | Clement et al. . |
| 3,770,970 | 11/1973 | Trump . |
| 3,801,741 | 4/1974 | Ablett . |
| 3,818,154 | 6/1974 | Presentey . |
| 3,881,106 | 4/1975 | Pocker et al. ........................ 250/221 |
| 3,886,361 | 5/1975 | Wester . |
| 3,945,129 | 3/1976 | Bergkvist . |
| 3,957,378 | 5/1976 | Zipin . |
| 4,028,695 | 6/1977 | Saich . |
| 4,041,258 | 8/1977 | Harada . |
| 4,056,722 | 11/1977 | Ray . |
| 4,074,131 | 2/1978 | Schwebel . |
| 4,092,532 | 5/1978 | Hayes . |
| 4,121,283 | 10/1978 | Walker . |
| 4,124,787 | 11/1978 | Aamoth et al. . |
| 4,161,726 | 7/1979 | Burson et al. . |
| 4,180,704 | 12/1979 | Pettit . |
| 4,198,623 | 4/1980 | Misek et al. . |
| 4,209,255 | 6/1980 | Heynau et al. . |
| 4,247,767 | 1/1981 | O'Brien et al. . |
| 4,250,378 | 2/1981 | Mutton . |
| 4,292,516 | 9/1981 | Nelson . |
| 4,313,109 | 1/1982 | Funk et al. . |
| 4,318,617 | 3/1982 | Orsen . |
| 4,345,248 | 8/1982 | Togashi et al. . |
| 4,379,968 | 4/1983 | Ely et al. . |
| 4,382,166 | 5/1983 | Kim . |
| 4,390,873 | 6/1983 | Kirsch . |
| 4,409,479 | 10/1983 | Sprague et al. . |
| 4,414,438 | 11/1983 | Maier et al. ........................ 340/709 |
| 4,442,351 | 4/1984 | Pfeifer et al. . |
| 4,459,476 | 7/1984 | Weissmueller et al. . |
| 4,464,652 | 8/1984 | Lapson et al. . |
| 4,472,629 | 9/1984 | Ort . |
| 4,476,462 | 10/1984 | Feldman ........................... 340/709 |
| 4,479,111 | 10/1984 | Madsen et al. . |
| 4,517,559 | 5/1985 | Deitch et al. . |
| 4,521,773 | 6/1985 | Lyon . |
| 4,533,827 | 8/1985 | Fincher ............................. 250/221 |
| 4,536,550 | 8/1985 | Carena et al. . |
| 4,584,510 | 4/1986 | Hollow ............................. 250/221 |
| 4,633,167 | 12/1986 | Kitts ................................. 340/709 |
| 4,670,743 | 6/1987 | Zemke ........................... 340/365 P |

FOREIGN PATENT DOCUMENTS 1163428 2/1964 Fed. Rep. of Germany .

OTHER PUBLICATIONS

Vic Kley, "Pointing Device Communication", *Computer Graphics World*, Nov. 1983.
IBM Technical Disclosure, vol. 19, No. 6, Nov. 1976, "Coded Sphere Joystick".

*Primary Examiner*—John W. Caldwell, Sr.
*Assistant Examiner*—Tyrone Queen
*Attorney, Agent, or Firm*—Bernard, Rothwell & Brown

[57] ABSTRACT

A computer control includes a control member movably mounted for movement in two dimensions wherein orthogonally related gratings are moved to the corresponding directions to generate pairs of quadrature related signals. Circuitry produces binary signals defining four states for each cycle of quadrature signals to change a corresponding count indicating position of the control member. In another variation patterns each having a plurality of spots with a unique combination of gray levels are sensed by a rectangular array of photosensers to determine the position of the movable member.

73 Claims, 27 Drawing Sheets

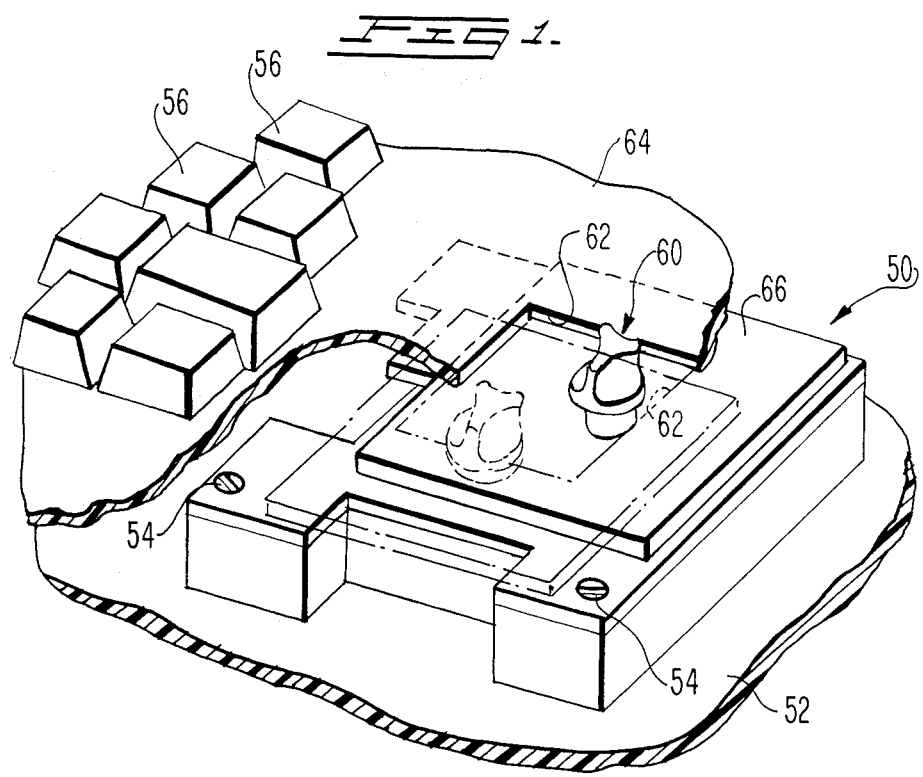

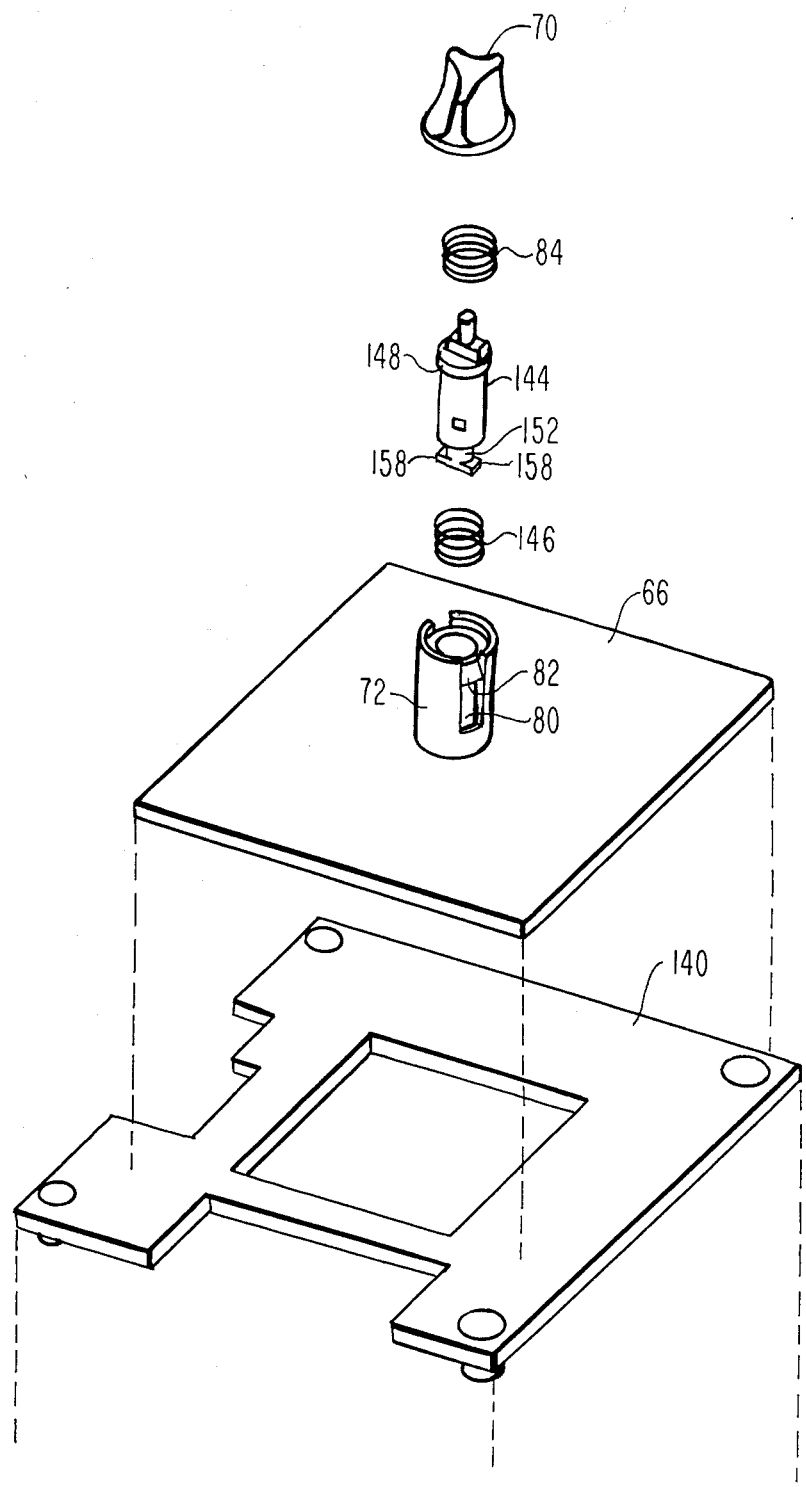

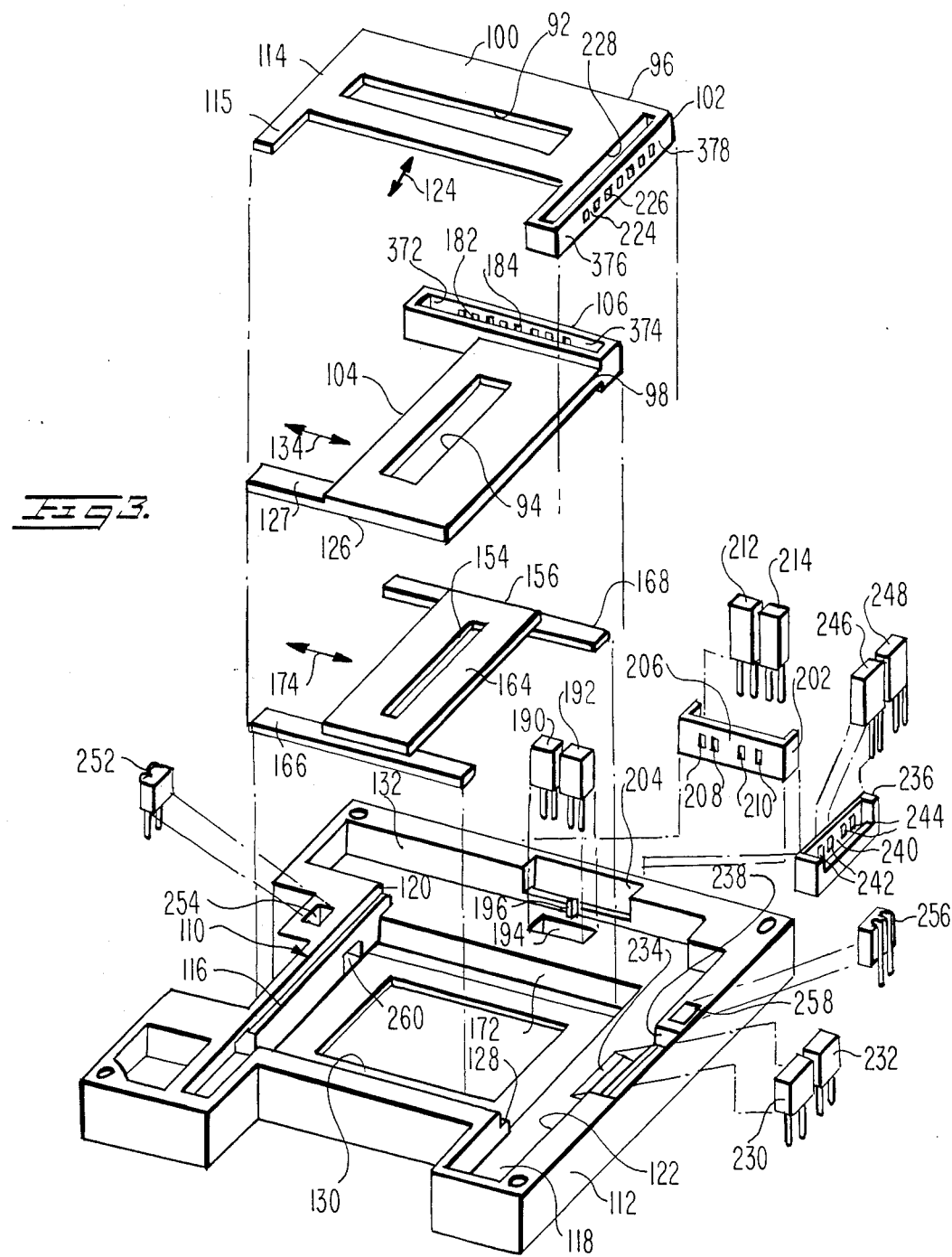

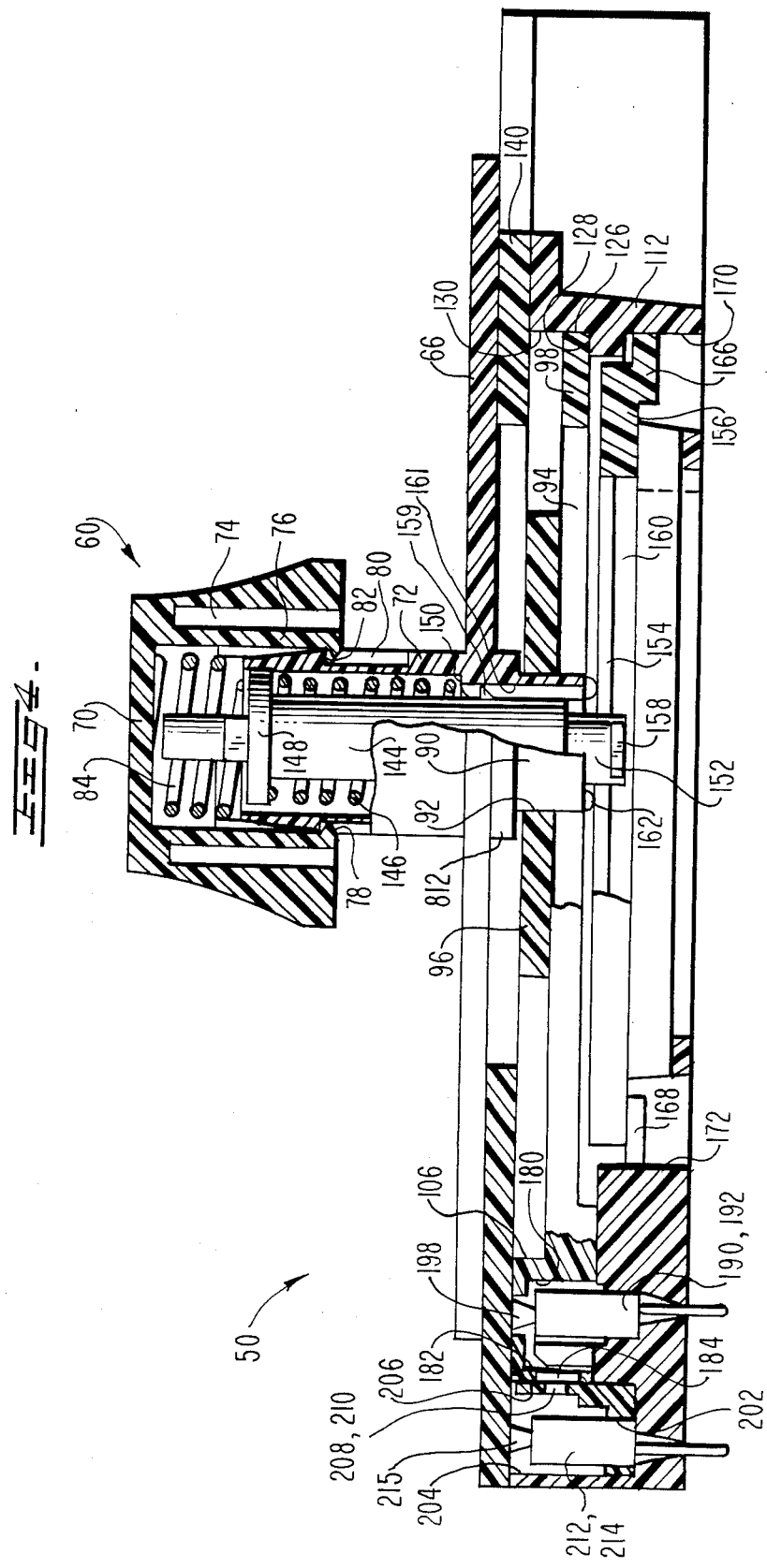

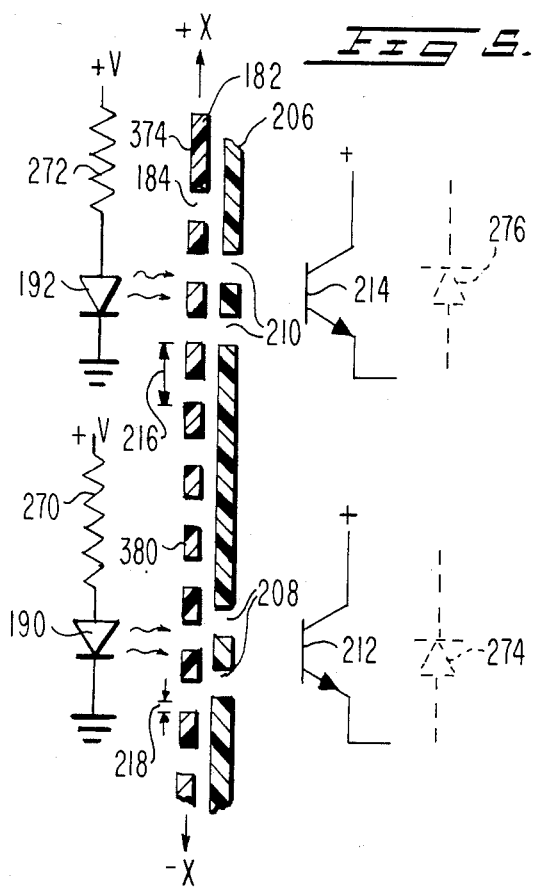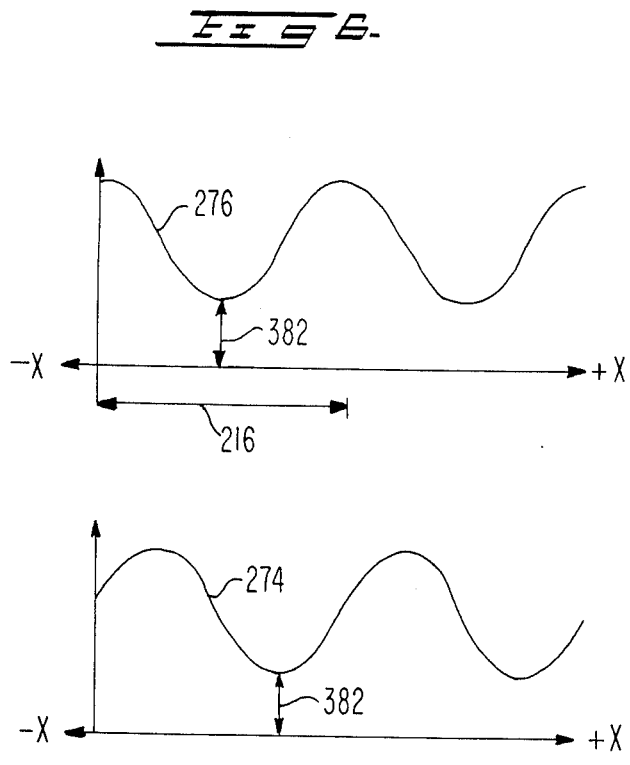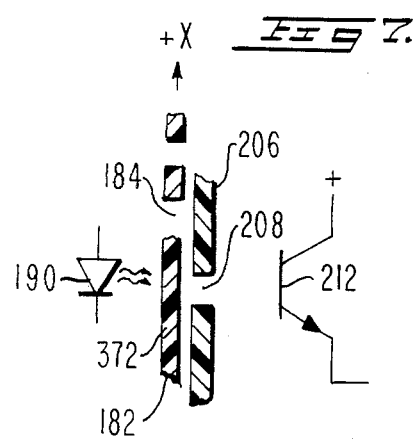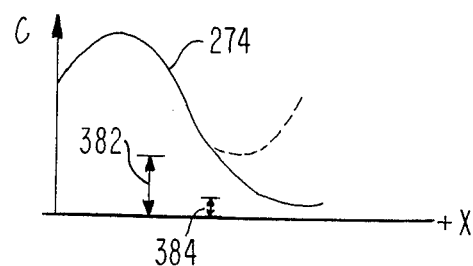

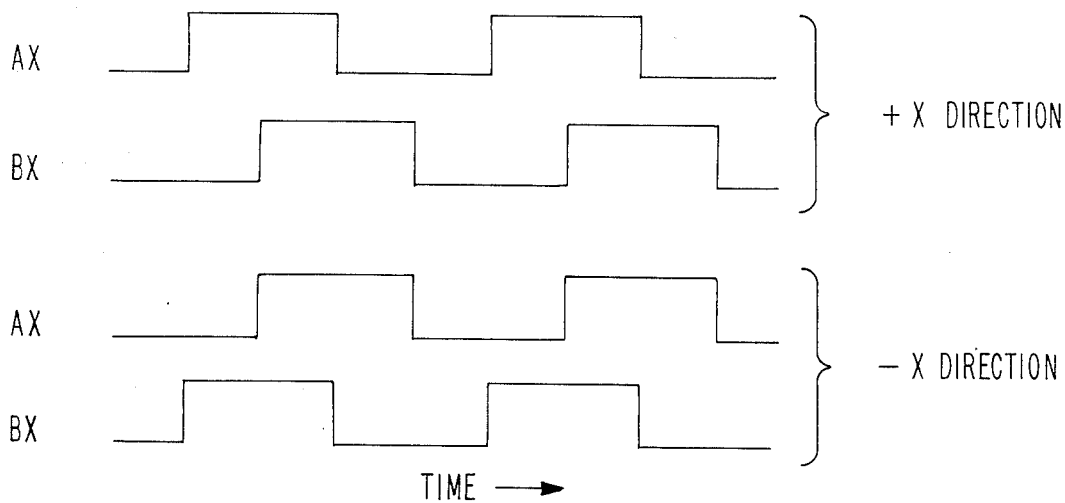
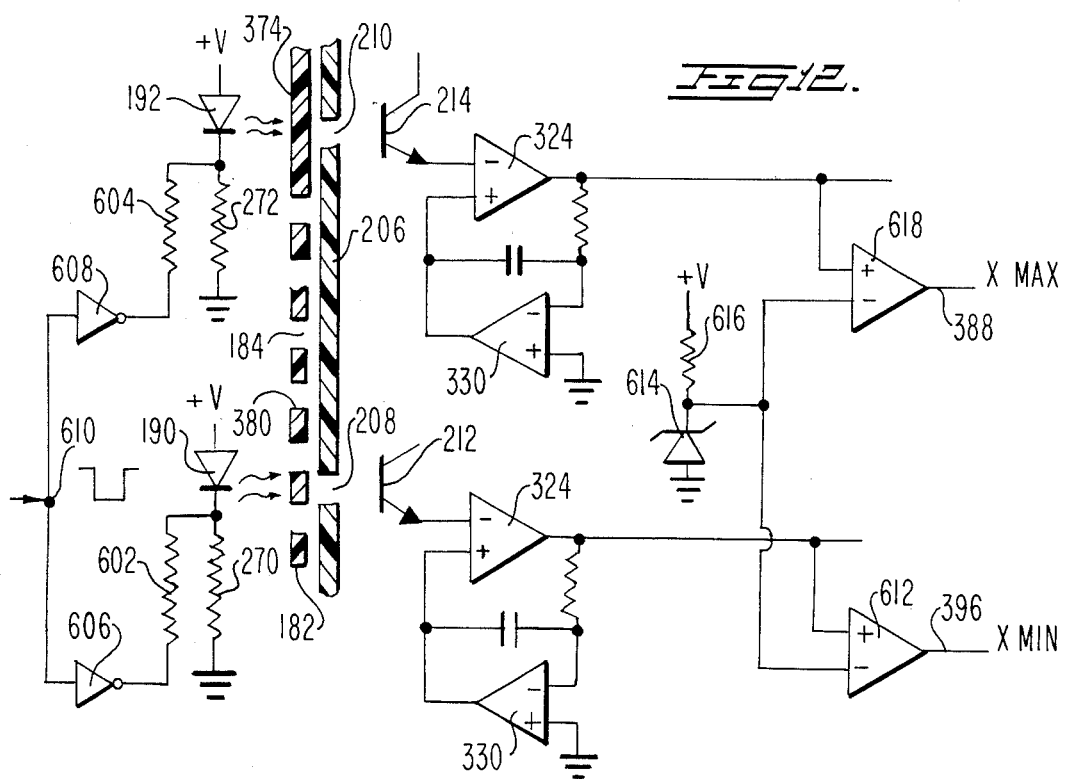

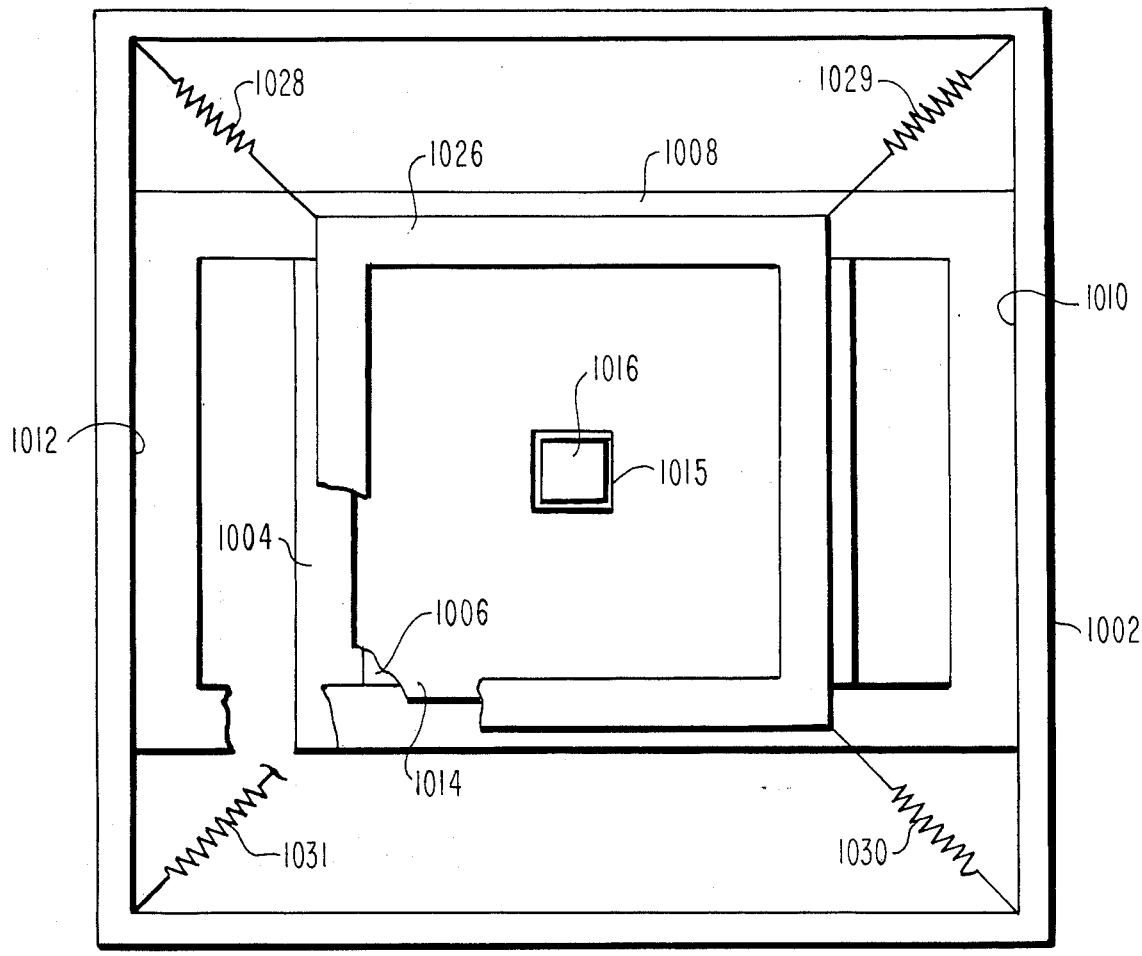
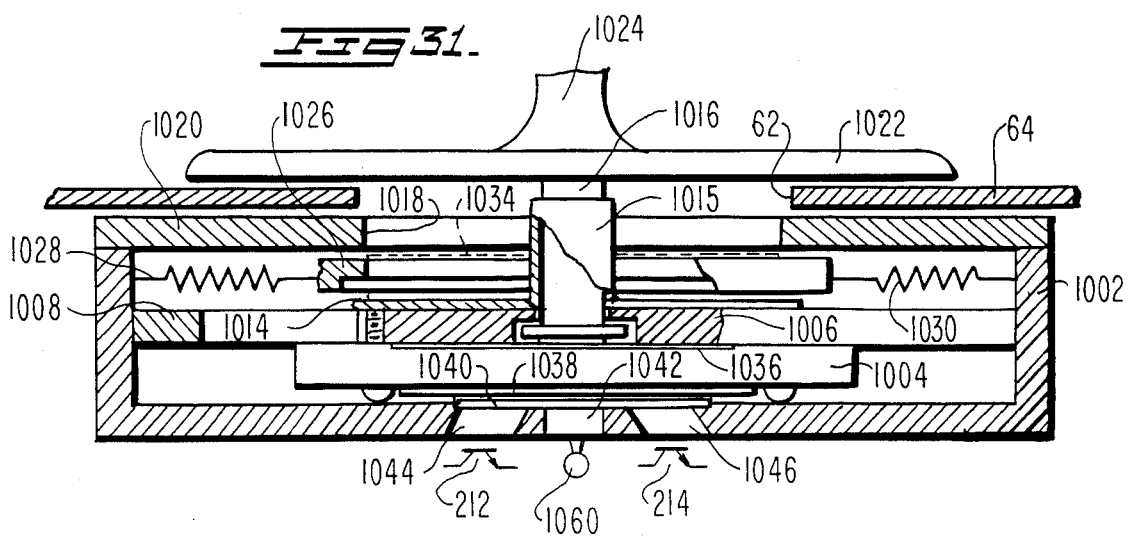

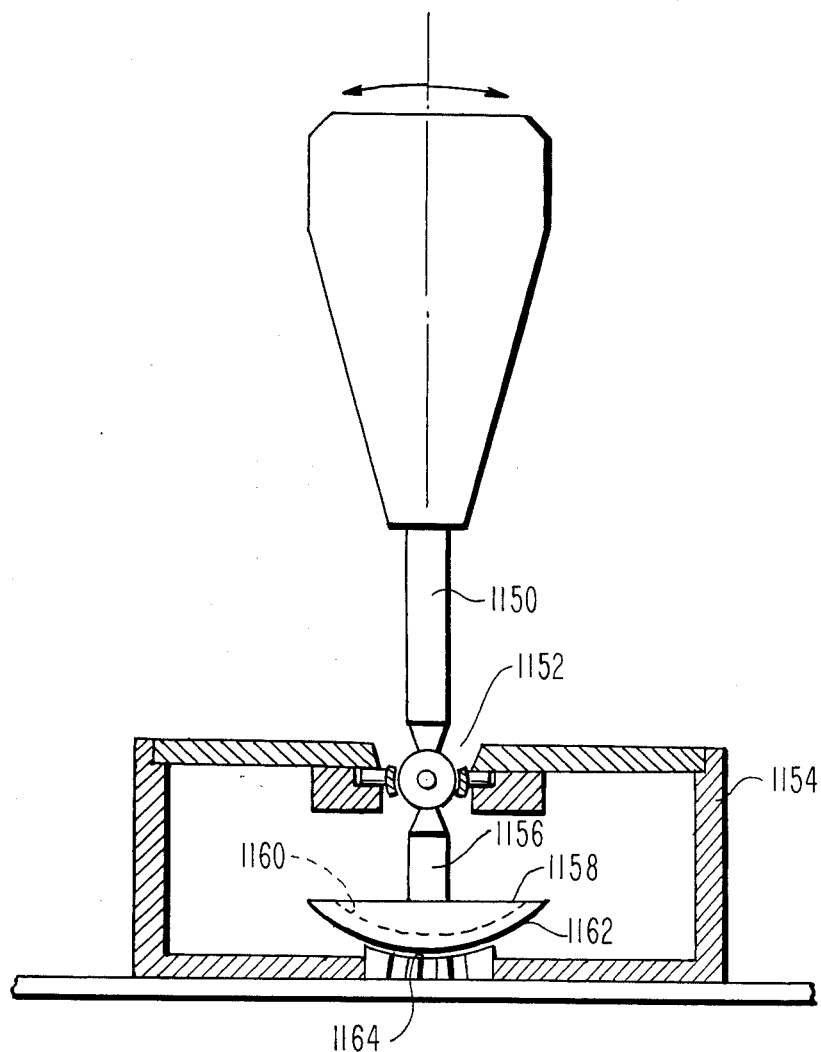

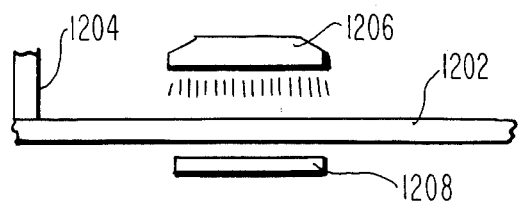
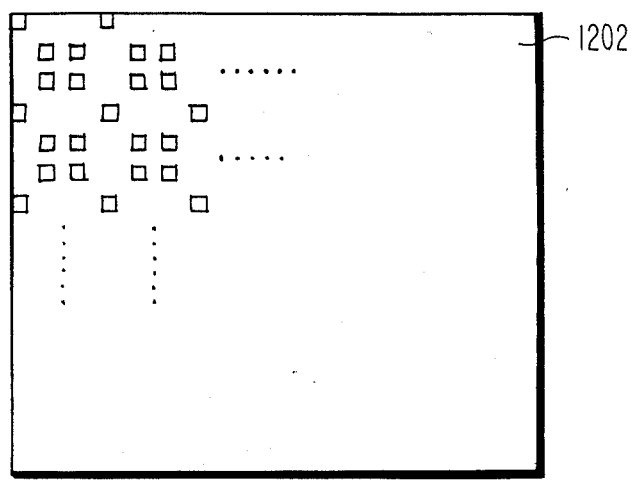
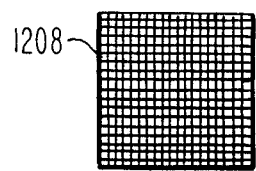
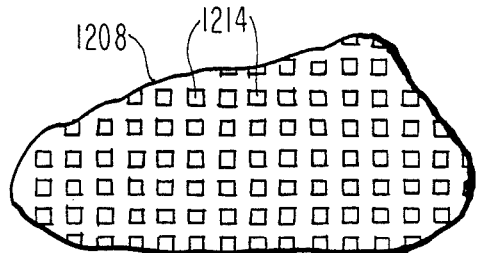
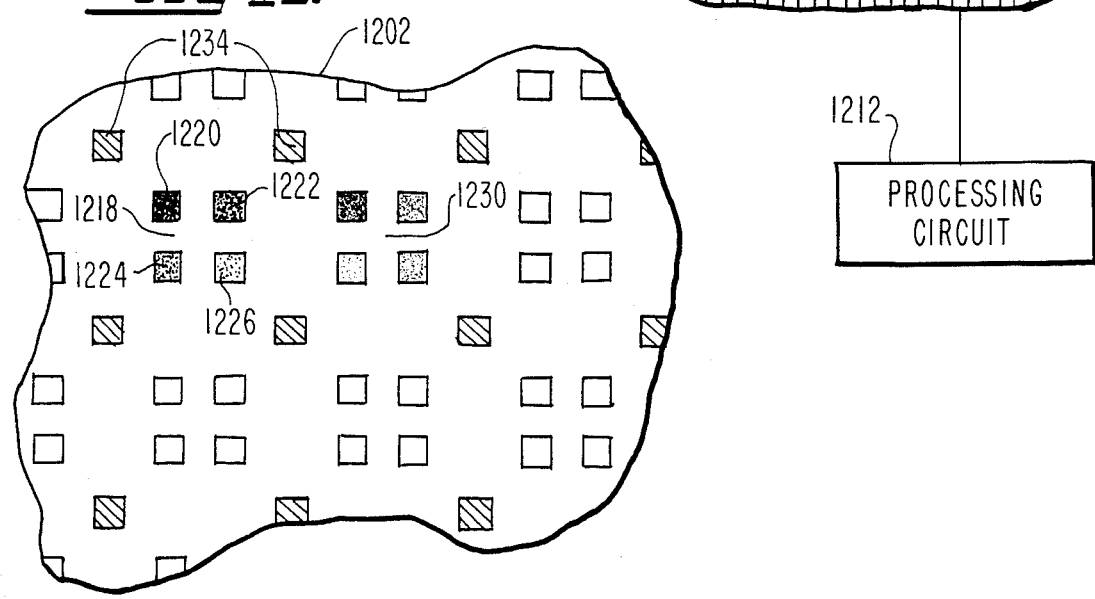

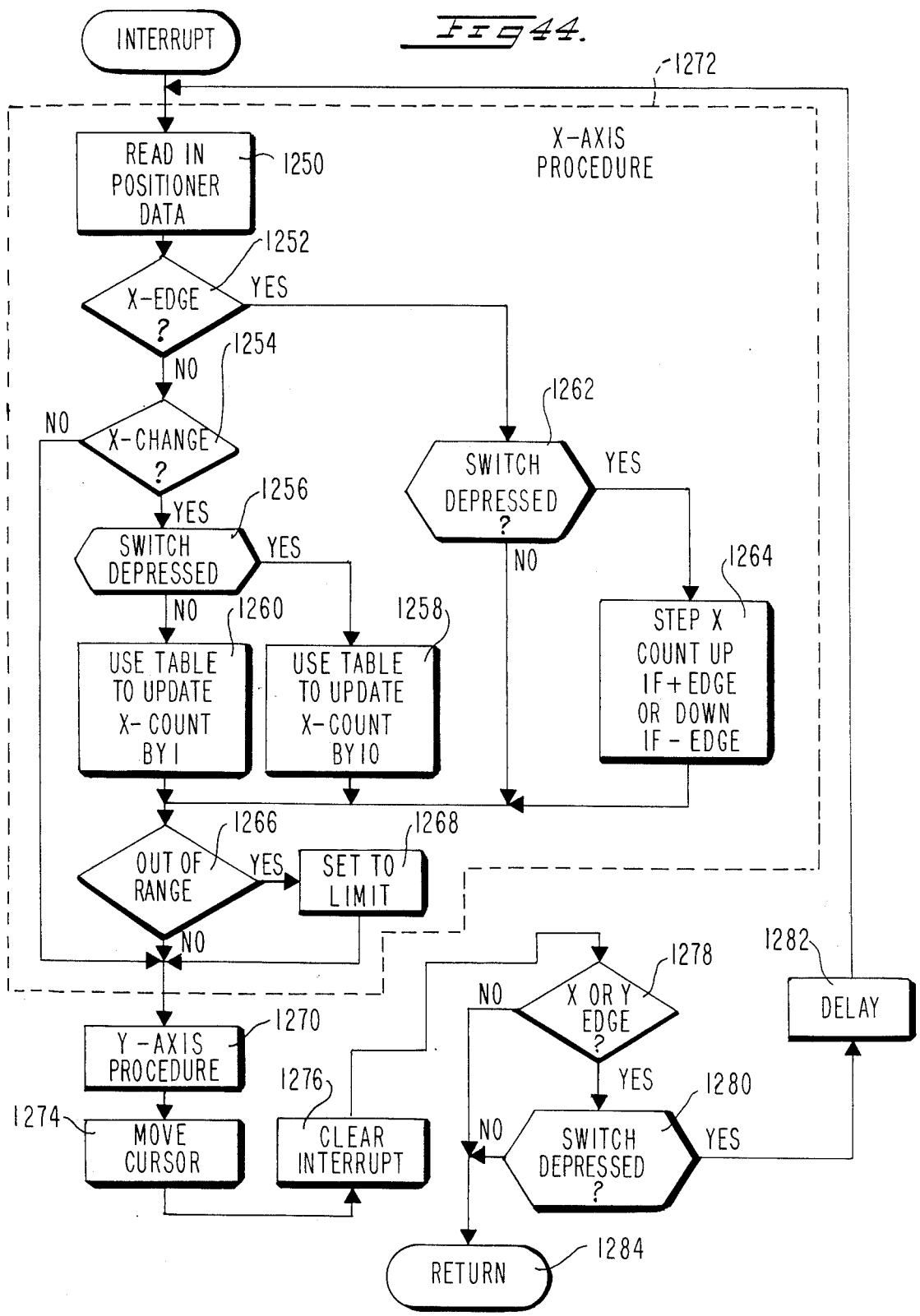

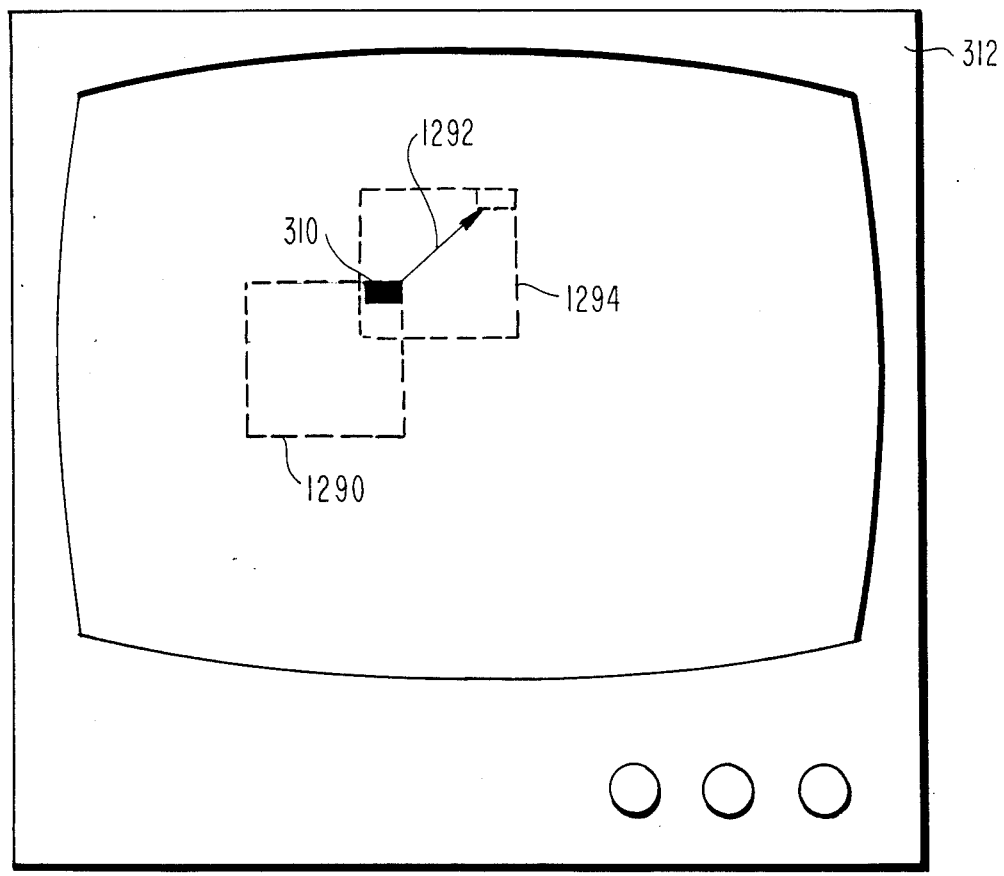

COMPUTER CONTROL

TECHNICAL FIELD

The present invention relates to computer control devices, and particularly to two-dimensional data entry devices which can be used for example to control the two dimensional positioning of a cursor or marker on a computer display or monitor.

DESCRIPTION OF THE PRIOR ART

One prior art technique for positioning the cursor on a computer monitor includes the use of four selected keys of a keyboard as positioning keys to move the cursor up, down, left and right, respectively. Many computer keyboards include special keys which have only the function of moving the cursor. In instances where the keyboard does not contain special cursor movement keys, a control key is provided for operating in the manner of a shift key to change the functions of selected keys normally used to enter letters, numbers, etc., to perform the cursor moving functions. Even though these cursor moving keys are often provided with automatic repeat functions, the cursor movement is relatively slow, and often requires multiple finger movements.

Various other devices have been used to provide for increased speed and control in movement of a cursor. Such devices include touch screens, light pens, tablets, mice, track balls, joysticks, and many other devices. Generally these devices suffer from one or more deficiencies such as requiring an operator to move his hand away from the keyboard, being relatively expensive, and/or requiring additional work or table space to operate.

SUMMARY OF THE INVENTION

The invention is summarized in a control for a computer, optionally mounted in the computer keyboard, wherein the control includes an upward projecting element which can be engaged and moved in two dimensions by fingers of one hand to correspondingly provide two dimensional data entry for the computer. The invention in particular features one or more provisions, such as the provision of a pair of members, coupled to the finger element for movement orthogonally within a housing and having respective light gratings which are utilized to operate digital circuitry providing data of the element position; the provision of movable members in the form of molded plastic plates having slots engaged by the finger element and with head portions molded with series of slots in walls thereof to form the gratings; the provision of the finger element being movable in a common key plane; the provision of a plate or skirt on the finger element covering a keyboard opening through which the finger element extends; the provision of a depressible cap which operates a vertical pin member sensed by a light sensor to indicate cap depression; a rotating disk coupled with the finger element and having a light grating producing rotative data in addition to the two dimensional data; the provision of circuitry which uses change in light detector signals to operate a binary or square wave signal producing circuit to eliminate calibration of the light detector circuit; the provision of opaque edges at the ends of gratings to produce detector signal levels indicative of the edges to accordingly reset and set counts corresponding to the position of the finger element; the provision of a retarding friction to motion corresponding to cursor up and down movement to reduce line jumping during horizontal movement; the provision of a circuit utilizing change in detector signals to operate hysteresis circuitry to produce a binary signal from light grating detector signals; the provision of automatic counter controlled parallel resistances to control light sensing element gain to eliminate circuit calibration; the provision of multiple gray level coding in plural regions of patterns spaced in two dimensions wherein decoding of the gray levels indicates position of the finger element; the provision of operator-controlled switch facilities associated with the finger element for selecting one of at least two modes of cursor movement such as fast and slow modes, or small and large increment modes of cursor movement; and/or the provision of a single light sensing element with a pair of alternately pulsed light emitters.

An object of the invention is to provide a substantially new and improved cursor control device for a computer which is less expensive and readily usable by operators.

An advantage of the invention is that a member is slidable within approximately a 1.25 inch (3.2 centimeter) square area corresponding to full movement of a cursor within a monitor with a resolution up to 2,048 by 2,048 or more points to control the positioning of the cursor.

Other objects, advantages and features of the invention will be aparent from the following description of the preferred embodiment taken in conjunction with the accompanying drawings.

BRIEF DESCRIPTION OF THE DRAWINGS

FIG. 1 is a perspective view of a broken-away portion of a computer keyboard illustrating a computer control device mounted upon a circuit board in accordance with the invention.

FIG. 2 is a perspective exploded view of the upper members of the computer control device of FIG. 1.

FIG. 3 is a perspective exploded view of the lower members of the computer control device of FIG. 1.

FIG. 4 is a cross-section view of the computer control device of FIG. 1.

FIG. 5 is a diagram illustrating the operation of moire pattern position detection and direction of the device of FIG. 1.

FIG. 6 is a diagram showing wave forms of respective detectors of the control device of FIG. 1.

FIG. 7 illustrates the use of one of the detectors for sensing a dark edge of the moire pattern.

FIG. 8 is a wave form diagram illustrating operation of the edge detection technique of FIG. 7.

FIG. 11 is a waveform diagram illustrating respectively opposite-phased, binary, quadrature-related signals produced by moire grating movement in respective opposite directions.

FIG. 12 is a diagram of another modified moire grating detector circuit.

FIG. 30 is a top view with portions broken away of a variation of the control device for controlling the monitor cursor.

FIG. 31 is an elevational section view of the device of FIG. 30.

FIG. 38 is an elevation view of a variation of the joystick type of digital control of FIGS. 36 and 37.

FIG. 39 is a side schematic view of a still further variation of the two dimensional control device of the present invention.

FIG. 40 is a plan view of a movable pattern arrangement employed in the device of FIG. 39.

FIG. 41 is a plan view of a detector array for use in sensing the positioning of the pattern sheet of FIG. 40.

FIG. 42 is an enlarged plan view of a portion of the pattern of FIG. 40.

FIG. 43 is an enlarged view of a portion of the detector of FIG. 41.

FIG. 44 is a flow diagram of another variation of a computer interrupt routine for controlling the position of a cursor.

FIG. 45 is an elevational front view of a computer monitor operating in accordance with one aspect of the invention.

DESCRIPTION OF THE PREFERRED EMBODIMENT

Figure 9:
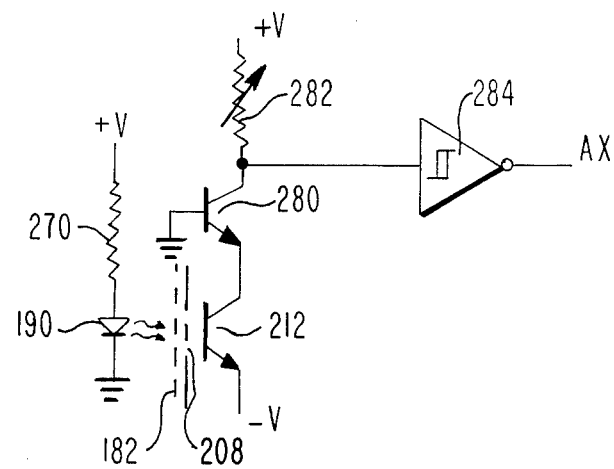
FIG. 9 is an electrical diagram illustrating a basic moire grating detector circuit.

As illustrated in FIG. 1, a computer control device indicated generally at 50 in accordance with one embodiment of the invention is mounted upon a circuit board 52 by screws 54, or other fastening devices such as rivets, adhesive, etc., within a keyboard of a computer. The circuit board 52 may also support the keys 56 of the keyboard. The control device 50 includes a finger engageable member or element indicated generally at 60 which extends upward through an opening 62 in the keyboard cover 64 into the plane of the keys 56. The member 60 is designed to be easily gripped by the thumb, index finger, and middle finger in a manner similar to the gripping of a pencil. The member 60 and a plate or skirt 66 on which the member 60 is mounted are movable in two dimensions which are parallel or lie in the planes of the keys 56 and the plate 66 as indicated by the long and short dashed lines. In one variation of the device 50, the position of the member 60 within a square area, which is about 3.2 centimeters on each side, corresponds to movement of a cursor on a computer monitor. Moving of the finger engaging member 60 and plate 62 from one side to the other will result in corresponding movement of the cursor from one side of the monitor screen to the other side, and similarly movement of the finger member 60 from back to front (or up and down if oriented vertically) results in corresponding movement of the monitor cursor from top to bottom. Additionally, in a preferred embodiment, the finger member 60 may be depressed which results in a switch or key operation of the device 50 for use by the computer.

As shown in FIGS. 2, 3 and 4, the finger engageable member 60 includes a cap 70 which is suitably contoured on its outer surface for being engaged by the thumb and first two fingers of an operator's hand, and which is slidably mounted for vertical movement on a hollow stem 72 integral with the plate 66 and extending upward therefrom. Slots 74 are formed in opposite sides of the cap 70 to define inner resilient walls 76 which at the lower edges thereof have projections 78 extending inward for being received in recesses 80 formed in the outer surface of the stem 72. The recesses 80 have widths greater than the projections 78 so that the cap 70 can rotate through a small angle corresponding to the angle that fingers rotate due to pivoting of a hand at the wrist in side-to-side moving of the finger element 60. At the upper edges of the recesses 80 there are defined shoulders 82 which cooperate with the projections 78 to retain the cap 70 on the stem 72. A compression spring 84 is interposed between the upper annular ledge formed in the stem 72 and the interior upper surface of the cavity of the cap 70 for normally urging the cap 70 upward to engage the projections 78 with the shoulders 82.

A lower extension 90 of the tubular stem extends from the underside of the plate 66 downwardly into the device 50 and has a square cross-section which is slidably engaged in slots 92 and 94 formed in respective upper and lower slide members 96 and 98. The member 96 has a strip or rectangular plate body portion 100 in which the slot 92 is formed and a head portion 102 mounted on one end of the body portion 100. The slide member 98 similarly contains a strip or rectangular plate body portion 104 in which the slot 94 is formed, and a head portion 106 on one end of the body portion 104. The members 96 and 98 are contained within a cavity indicated generally at 110 in a housing 112. The distal edge 114 of the member 96 and a guide extension 115 thereon is slidingly supported upon a shoulder 116 of the housing 112, while the head portion 102 is slidingly supported upon a ledge 118 of the housing 112. The distal edge 114 and the outer wall of the head portion 102 define respective edges which are slidably retained between opposite walls 120 and 122 of the cavity 110 with a tolerance selected to restrict movement of the member 96 along an axis indicated by the double arrow headed line 124, while permitting relatively easy sliding movement of the member 96 within molding tolerances acceptable for mass production of the member. The extensions of the guide 115 and the head portion 102 tend to prevent twisting and binding of the plate 100. Similarly, the distal edge 126 of the member 98 with guide extension 127 is slidingly supported upon a shoulder 128 with the head portion 106 slidingly supported on the ledge 118 wherein the distal edge 126 is slidingly restrained by a vertical wall 130 extending upward from the ledge 128 and with the face of the head portion 106 slidingly engaging a vertical wall 132 for restraining sliding movement of the member 98 in a direction along the axis defined by double arrow headed line 134. The body portion 100 of the member 96, as well as its slot 92, are orthogonal to the body portion 104 and corresponding slot 94 of the member 98. The axes 124 and 134 are perpendicular to the respective slots 92 and 94 as well as to each other. When the finger engaging member 60 is moved, the square stem portion 90 slides within the slots 92 and 94 to move members 96 and 98 along the axes 124 and 134 to positions along the axes 124 and 134 corresponding to the two dimensional position of the member 60. The upper and lower members 96 and 98 are designed so that the plate body portion 100 slides on top of the plate body portion 104 and are retained within the housing 112 by a cover 140 which is secured to the outer upper edges of the housing 112 by adhesive, ultrasonic bonding, or other conventional technique.

In order to retain the plate 66 and the tubular stem 72 on the device 50, there is provided a pin member 144 extending through the central openings of the upper and lower stem portion 72 and 90. A compression spring 146 is contained between an upper collar 148 formed integral on the pin 144 and a annular inner shoulder 150 formed on the interior wall of the hollow stem portion 72 for urging the pin 144 upward. A lower end portion 152 of the pin 144 has a smaller diameter than the upper portion of the pin 144 and extends through a slot 154 in a guillotine member 156 which is also slidably contained within the cavity 110 of the housing 112 below the slide members 96 and 98. Tabs 158 extend outwardly from the reduced pin portion 152 for interlocking engagement with the upper surface of a recess 160 formed in the underside of the member 156 and extending along opposite sides of the slot 154 to retain the upper assembly of the skirt 66, stem 72, pin 144 and cap 70 on the device 50. A projection 159 of the pin 144 extends into an interior vertical slot 161 of the lower stem portion 90 to prevent the pin 144 from rotating relative to the stem and skirt. The guillotine member 156 is normally urged to a raised position by the spring 144 to engage the upper surface of the member 156 with small sliding projections 162 formed on the bottom edge of the square hollow stem portion 90.

The guillotine member 156 includes a strip or plate body portion 164 with wing portions 166 and 168 formed on respective opposite ends of the plate portion 164 perpendicular thereto for slidingly engaging respective walls 170 and 172 of the housing 112 to restrain movement of the guillotine member 156, when the finger member 160 is moved in its two dimensional directions, to movement along an axis indicated by double arrow headed line 174 which is parallel to the axis 134. For movement of the member 60 in a direction orthogonal to the axis 174, i.e., in the direction along axis 124, the lower pin portion 152 must slide in the slot 154 against the frictional forces produced by the tabs 158 and projections 162 engaging the respective lower and upper surfaces of the member 156. These frictional forces are determined by the spring factor of the spring 146 which is selected to produce a desired amount of resistance to sliding movement of the plate 66 and finger engaging member 60 along the axis 124. The axes 134 and 174 are preferably selected to correspond to left and right or X-direction of movement of the cursor while the axis 124 is preferably selected to correspond to upward and downward or Y-direction of movement of the cursor on the screen. The frictional resistance to movement of the two-dimensional cursor control in the up and down direction is found to improve the control device for certain applications such as word processing, vertical placement, etc. In word processing, the control device can be readily moved from left to right or from right to left while the functional resistance resists unwanted up or down cursor movement to adjacent lines. The frictional resistance can be released by depressing the cap 70 to depress the pin 144 slightly downward to release the gripping action of the tabs 158 and projections 152 on the member 156. The employment of the two springs 84 and 146 enables independent selection of the resistance to Y-direction movement and cap depressing force except that the cap depressing force must be equal to or greater than the spring force of spring 146; the depressing force can be made equal to the spring force 146 by illuminating the spring 84. During such depression the cursor control device 60 can be moved freely in its two dimensional field of movement.

As shown in FIGS. 3 and 4, the head 106 is elongated perpendicular to the body portion 104 and parallel to the axis 134 with central groove or slot 180 extending between opposite end walls of the head 106. The groove 180 thus defines a thin end wall 182 which slidingly engages the wall 132 and in which are formed a plurality of slots or openings 184 forming a grating therein. The slots 184 are uniformly spaced along the center portion of the length of the wall 182 with the longitudinal dimension of each slot 184 extending vertically and with the width dimension of each slot extending horizontally. The slots 184 have a width which is substantially equal to the spacing or opaque bars between the slots 184. A pair of light-emitting diodes 190 and 192 are contained within a recess 194 formed in the ledge 118 of the housing 112 and extend upwardly therefrom into the cavity 180 such that the LEDs 190 and 192 direct light toward the slots 184. A light blocking shield 196 extends upward from the ledge 118 to block light from one of the LEDs 190 and 192 crossing in front of the other. Projections 198 from the cover 140 engage the LEDs to insure proper positioning.

A stationary mask member 202 is contained within a recess 204 in the base housing 112 opening through the wall 132. The mask 202 has a thin wall section 206 extending parallel to the wall 182. The wall 206 contains two slots 208 and two slots 210 which are aligned with the row of slots 184 for selectively passing light to respective light sensors such as photodiodes or phototransistors 212 and 214 which are contained within the mask member 202 and held by cover projections 215. The slots 208 are elongated in the vertical dimension and have a width and spacing equal to the width and spacing of the slots 184, and the slots 210 similarly have an elongated vertical dimension and a width and spacing equal to the slots 184. However, as shown in FIG. 5, the spacing of the slots 208 from the slots 210 is selected so that the slots 208 are 90° out of phase (quadrature phase related) with the slots 210, i.e., if the spacing from the beginning of one opening 184 to the beginning of the next opening 184 as shown by the double arrow line 216 is considered as one cycle, than the openings 208 are offset relative to the openings 210 by one-fourth of the cycle as illustrated by the distance 218.

The size and number of openings 184, 208 and 210 are selected to produce a desired excitation of the sensors 212 and 214 under fully open conditions and to produce a desired resolution in detecting movement of the openings 184 relative to the openings 208 and 210. The width of the openings 184, 208 and 210, typically 0.02 inches (0.5 millimeters), is selected to produce the desired resolution or number of openings 184 limited in smallness by the minimum width which is practical for production of parts by high volume plastic molding techniques. In one example there are 31 openings 184 producing a resolution of about 84 points. The number of the openings 208 and the number of the openings 210 can be one, two (as illustrated in FIG. 5), or more, and is selected to provide sufficient light passage to produce adequate modulation of the conductivity of the photosensing elements 212 and 214. In one embodiment employing typical phototransistors 212 and 214, it is found that one opening 208, such as illustrated in FIG. 7, provides about 60 to 80% of the maximum excitation of the phototransistor by light passing through a plurality of the openings 208.

It has been discovered that improved operation is obtained by making the length of the openings 184, i.e., the height or longitudinal dimension of the openings 184, substantially greater or smaller than the length of the openings 208 and 210 and centering the length of the shorter opening relative to the longer opening. In order to permit relatively easy movement of the slide member 96, it must be manufactured with sufficient tolerance relative to the height of the recess in the housing containing the slide member. During movement of the slide member 96, some vertical movement of the member 96 relative to the stationary portions is unavoidable. Such relative vertical movement results in unwanted modulation of light passing through the openings 184 and 208 and 210. The different length and centering of the openings 184 relative to the length of the openings 208 and 210 avoids such unwanted modulation of light. As illustrated in FIG. 4, typically the openings 184 can be made with a dimension of about 0.085 inch (2.2 millimeters) and the openings 208 and 210 can be made with a length of about 0.075 inch (1.9 millimeters).

Referring back to FIG. 3, the head portion 102 is substantially similar to the head portion 106 in that it contains a wall 224 extending parallel to the direction 124 and having a plurality of slots 226 formed therein substantially similar to the wall 182 and slots 184 of the head 106. The wall 224 is spaced from a wall 228 to define a longitudinal groove or slot therebetween into which extend upper portions of light-emitting diodes 230 and 232 which have their lower portions mounted in a recess 234 in the ledge 118 similar to LEDs 190 and 192. A mask 236 is contained within a recess 238 in the wall 122 and has a wall 240 containing respective pairs of openings 242 and 244 substantilly identical to the mask 202. Phototransistors 246 and 248 have upper light sensing portions aligned with the respective pairs of openings 242 and 244 and have lower portions retained within the housing 112 similar to the retention of the phototransistors 212 and 214.

Additionally, there is contained an LED 252 retained within a cavity 254 in one side wall of the housing 112 and a phototransistor 256 retained in a recess 258 in the opposite wall of the housing 112. The housing is provided with openings (only opening 260 shown in FIG. 3) which extend from the respective recesses 254 and 258 toward each other so that light from the LED 252 normally impinges upon the phototransistor 256. These openings 260 are disposed below the normally raised position of the guillotine member 156 such that when the cap 70 of the finger member is depressed to lower the pin 144 and the guillotine member 156, light from the LED 252 is interrupted by the lowered guillotine to reduce the conductivity of the phototransistor 256 to produce a switch indication.

The LEDs 190, 192, 230, 232 and 252 and the phototransistors 212, 214 246, 248 and 256 are connected to circuitry on the printed circuitboard 52, FIG. 1, in a conventional manner. As shown for the LEDs 190 and 192 in FIG. 5, the LEDs will be energized by current through respective resistances 270 and 272. Movement of the slide member 98 and its corresponding wall 182 causes modulation of the light passing from the LEDs 190 and 192 through openings 184 and respective openings 208 and 210 to modulate the conductivity of the photosensors 212 and 214 as shown by the wave forms 274 and 276 in FIG. 6. It is noted that these wave forms 274 and 276 are phase shifted relative to each other by about 90° per cycle 216 of movement of the wall 182.

Photodiodes can be substituted for the phototransistors utilized in the control 50. Such substitution is illustrated by photodiodes shown in dashed lines 274 and 276 in FIG. 5. The photodiodes produce substantially similar conductivity curves as those shown in FIG. 6. The phototransistors have the advantage of producing a higher degree of change in conductivity relative to change in impinging light since the base emitter current is amplified in the collector emitter current of the phototransistor. Photodiodes have the advantage of being faster in response. Thus, phototransistors are preferred in applications where relatively high gain or output is desired, and photodiodes are preferred where the circuit must respond rapidly to changes in light intensity such as in sampling or rapid pulsing applications.

The current flow through or voltage across the light sensors is converted into binary signals suitable for use by digital logic circuit and/or computer circuitry. One type of converting circuit is illustrated in FIG. 9 for the light sensor 212. The light sensor 212 is connected between the emitter of a transistor 280 and a −V voltage source. The base of the transistor 280 is grounded and the collector of the transistor 280 is connected in series with a resistance 282 to the +V source. A Schmidt trigger inverter circuit 284 produces a square wave output in response to movement of the grating 182 past the openings 210, as illustrated by the wave form AX in FIG. 11. A similar circuit (not shown) including the light sensor 214 will produce a signal BX. It is noted that the phase of AX relative to BX when the grating 182 is moved in the +X direction is different than the phase of AX relative to BX when the grating is moved in the −X direction as illustrated by the respective upper and lower pairs of wave forms AX and BX in FIG. 11. These wave forms represent binary signals which are illustrated in Table 1 which can be sensed by logic circuitry or computer circuitry to determine movement and the direction of movement of the grating 182.

TABLE I

| | | ←1 Cycle→ | | | |
|---|---|---|---|---|---|
| AX | 0 | 1 | 1 | 0 | 0 |
| BX | 0 | 0 | 1 | 1 | 0 |
| | | Count up→ | | | |
| | | ←Count down | | | |

For example, if AX and BX are both initially 0 and AX is found to change to 1 while BX remains at 0, this corresponds to one quadrant of movement in the +X direction and this can be utilized to increment a counter which contains a count corresponding to the position of the grating or the finger element 60 in the X direction. If BX changes to 1, while AX remains at 0, then the count is decremented. Similarly, a count is maintained of movement in the Y direction. The technique employed in FIG. 9 for converting the light sensor conductivity into binary signals is a direct current (DC) conversion. Since the parameters of LEDs, light sensing elements, transistors, and other components vary, DC conversion circuits such as of the type shown in FIG. 9 generally require calibration such as by adjusting the resistance 282, the corresponding LED excitation, or other adjustment or compensation. Otherwise a DC shift due to parameter variations can, result in binary wave forms AX and BX where the positive half cycle of one waveform is shortened and the positive half cycle of the other waveform lengthened to such a degree that the quadrature relationship can no longer be detected.

Figure 10:
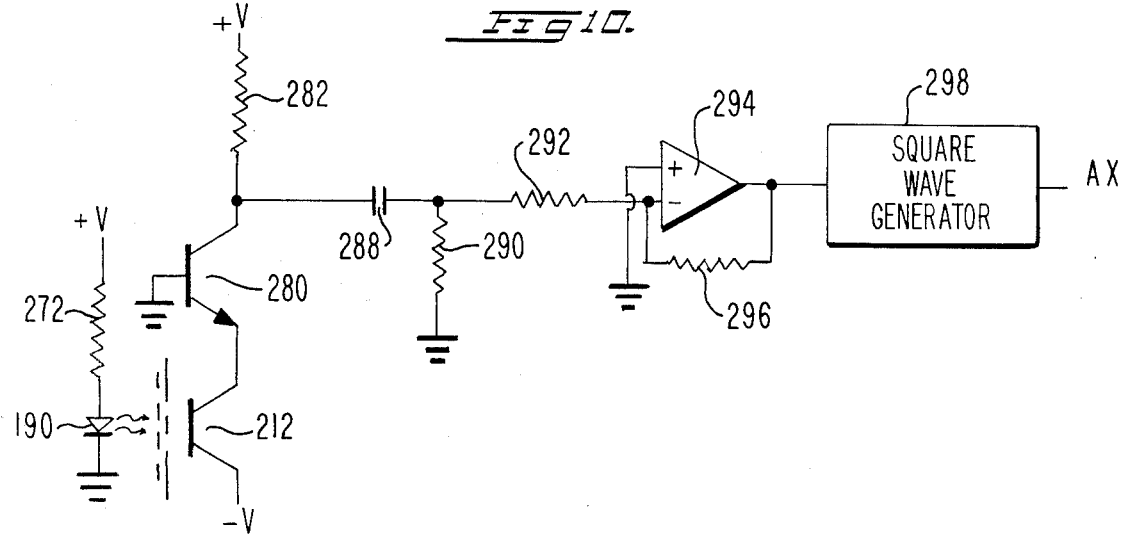
FIG. 10 is an electrical diagram of a modified moire grating detector circuit for use in the device of FIG. 1.

Another type of circuit for converting the conductivity of the light sensor 214 into binary signals is illustrated in FIG. 10. This circuit is a zero crossing detection or alternating current (AC) circuit. The collector of the transistor 280 is coupled by a capacitance 288 to a resistance 290 connected to ground to form a differentiating circuit. The junction of the capacitance 288 with the resistance 290 is connected by a resistance 292 to one input of an operational amplifier 294 which has its reference input connected to ground and which includes a negative feedback resistance 296. The output of the amplifier is applied to a square wave generator 298 which responds to positive and negative pulses to switch to the high and low, respectively, of the AX signal. A square wave generating circuit is illustrated in long and short dashed box 298 of FIG. 13 described hereinafter. The voltage across the capacitance 288, during control movement, adjusts to about the average DC level to thus produce a voltage shift of the waveform on the inverting input of the amplifier 294 to account for differing DC levels due to parameter variations. The output AX from the circuit of FIG. 10 will be substantially smilar to the output AX of the circuit of FIG. 9. The AC type circuit of FIG. 10, while generally not requiring calibration during manufacturing, has the disadvantage that the count can be falsely incremented or decremented during stop and go or slow movement of the finger member 60. For example, the capacitance 288 can discharge when the collector of the transistor 280 remains at a low voltage for a long duration, and subsequent movement of the grating increasing the voltage on the collector of transistor 280 can operate the comparator 294 at a time advanced in phase relative to its normal phase, and with a variation in phase with respect to the BX signal, such advance may result in a loss of a count or an extra count being produced. Under most computer uses, the loss of a count or the insertion of an extra count is generally unnoticeable to the computer user.

Figure 13:
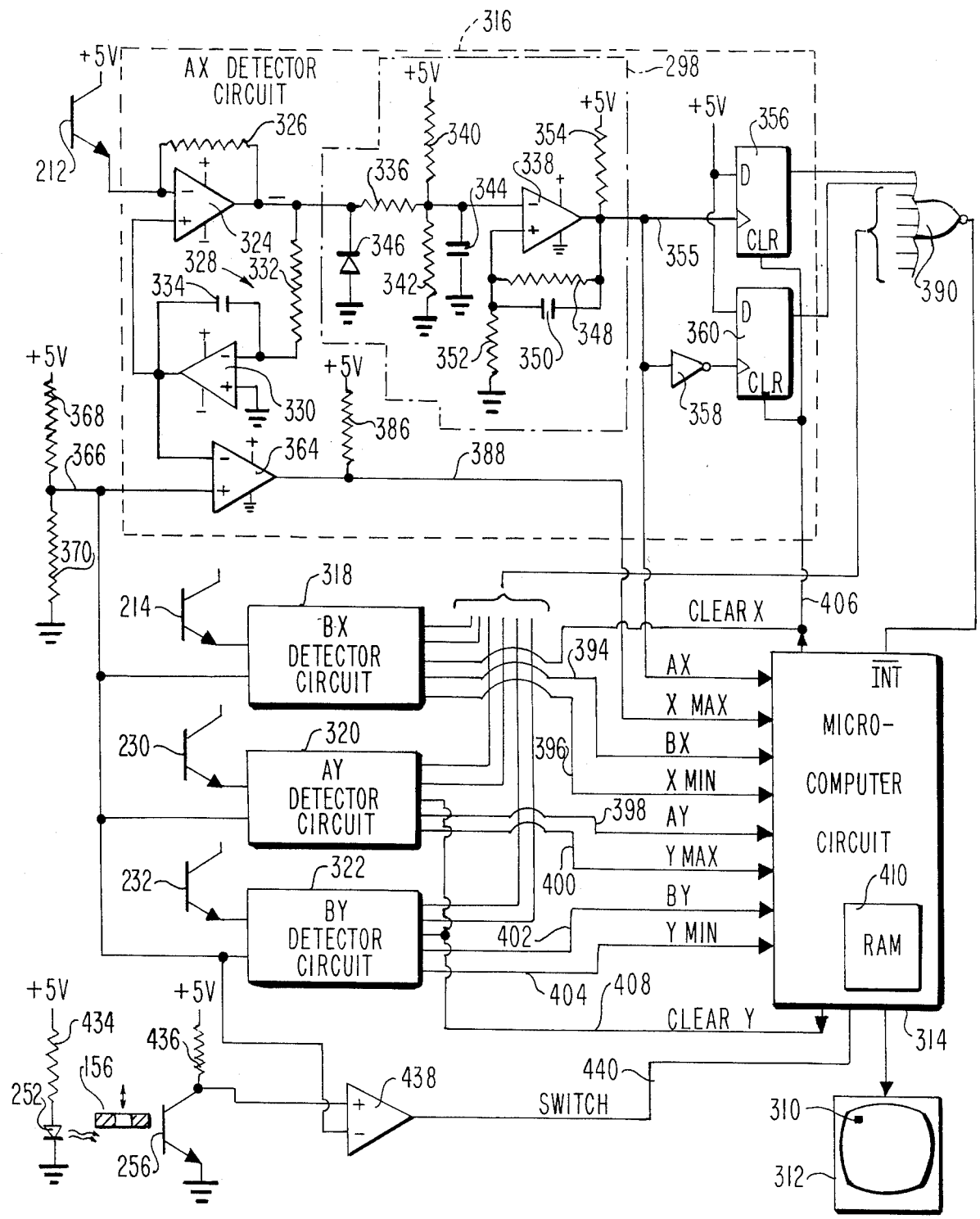
FIG. 13 is a schematic diagram of an electrical circuit utilizing the device of FIG. 1 for maintaining cursor position.

In FIG. 13, a circuit for controlling the position of a cursor or marker 310 on a monitor 312 which is controlled by a microcomputer circuit 314 includes an AX detector circuit, enclosed within the dashed box 316, along with substantially similar BX detector circuit 318, AY detector circuit 320 and BY detector circuit 322 operated by the respective light sensors 212, 214, 230 and 232. In the AX detector circuit 316, the light sensor 212 is connected in series with the inverting input of an operational amplifier 324 which has a negative feedback resistance 326. An inverting integrating circuit indicated generally at 328 is connected between the output of the operational amplifier 324 and the non-inverting input thereof. This inverting integration circuit 328 includes an operational amplifier 330 having its inverting input connected by a resistance 332 to the output of the amplifier 324. An integrating capacitance 334 is coupled between the inverting input and output of the amplifier 330 which has its non-inverting input connected to ground. The output of the operational amplifier 324 is coupled by a resistance 336 to the inverting input of a comparator 338. This inverting input is biased by a voltage divider formed by resistances 340 and 342 connected between the positive voltage source and ground. A filter capacitance 344 is also coupled between the inverting input of the comparator 338 and ground. A diode 346 is connected between ground and the output of the operational amplifier 324 for limiting output voltages to values above about −1 volt. A resistance 348 connected in parallel with a capacitance 350 is coupled between the output of the comparator 338 and its non-inverting input which is coupled by a resistance 352 to ground. A bias resistance 354 is coupled between the output of the comparator 338 and the positive voltage source. The output of the comparator 338 is connected to a clock input of a flip-flop 356, and by an inverter 358 to the clock input of a flip-flop 360 wherein the flip-flops 356 and 360 have their data inputs connected to the positive voltage source.

In operation of the AX detector circuit 316, the operational amplifier 324 responds to changes in current flow from the light senser 212. The output of the integrator circuit 328 after a delay determined by the capacitance 334, follows the voltage from sensor 212 to return the output of the operational amplifier 324 to zero. Thus, the output of amplifier 324 is a differentiation of the voltage from the sensor 212 and reflects only changes that occur in the light sensor 212 signal. The comparator 338 due to the positive feedback resistance 348 and capacitance 350 operates as a hysteresis circuit or a Schmidt trigger stable in both high and low states with zero input voltage so that on positive going pulses from the amplifier 326, the output of comparator 338 goes low, and on negative going pulses from the output of amplifier 324, the output of comparator 338 goes high. When the output of the comparator 338 goes high, the flip-flop 356 is operated, and when the output of the comparator 338 goes low, the flip-flop 360 is operated.

The AX detector circuit 316 also has a comparator 364 having its inverting input connected to the output of the operational amplifier 330 and having its non-inverting or reference input connected to the junction 366 between two resistances 368 and 370 forming a voltage divider across the voltage source to form a reference voltage. Referring to FIG. 3, it is noted that the wall 182 has end portions 372 and 374 which do not contain any of the openings 184. The head portion 102 of the slide member 96 contains similar end wall portions 376 and 378 which are absent any openings 226. These end wall portions are utilized for detecting the X and Y maximum and minimum positions of the control. For example, as shown in FIG. 5, the grating 184 will pass a certain amount of light from the LEDs 190 and 192 even when the grating 184 is positioned so as to place opaque bar-like portions 380 over the openings 208 or 210. This light leakage is due to reflection, defraction, transmission through edges, etc., of the light from the LED 192. Thus, the minimum conductivity of the photosensors produced by the grating 182 is indicated by the dimension 382 in FIG. 6. However, when the end portion 372, as shown in FIG. 7, is positioned over the opening or openings 208, the light passing to the light senser 212 is substantially reduced to produce a substantially lower conductivity 384 as shown in FIG. 8, which is substantially less than the conductivity 382 of the light senser 212. This lower conductivity of the senser 212 produces a a corresponding lower voltage output on the amplifier 330 to lower the voltage on the inverting input of comparator 364 to a level below the reference voltage on junction 366 which is selected to be less than the normal voltage produced by the conductivity 382. This causes the output of comparator 364, which is normally biased positive by resistance 386, to go high and produce a high on line 388 which indicates the control device in the maximum X position.

The outputs of the flip-flops 356 and 360, along with corresponding flip-flop outputs of BX detector circuit 318, AY detector circuit 320 and BY detector circuit 322, are connected to inputs of a NOR gate 390 which has its output connected to an interrupt input of the microcomputer circuit 314. The AX output 355, the X maximum line 388, along with similar lines (BX line 394, X minimum line 396, AY line 398, Y maximum line 400, BY line 402, and Y minimum line 404) from the respective detector circuits 318, 320 and 322 are connected to corresponding inputs of the microcomputer circuit. A clear X line 406 from an output of the microcomputer circuit 314 is connected to clear inputs of the flipflops 356 and 360, as well as to corresponding clear inputs of flip-flops (not shown) in the BX detector circuit 318; a clear Y line 408 is connected to clear inputs of similar flip-flops (not shown) in the AY detector circuit 320 and BY detector circuit 322. The microcomputer circuit 314 includes a random access memory (RAM) 410 where an X count and a Y count are maintained to indicate the position of the control member 60 to thus control the position of the cursor 310 on the monitor 312.

Figure 14:
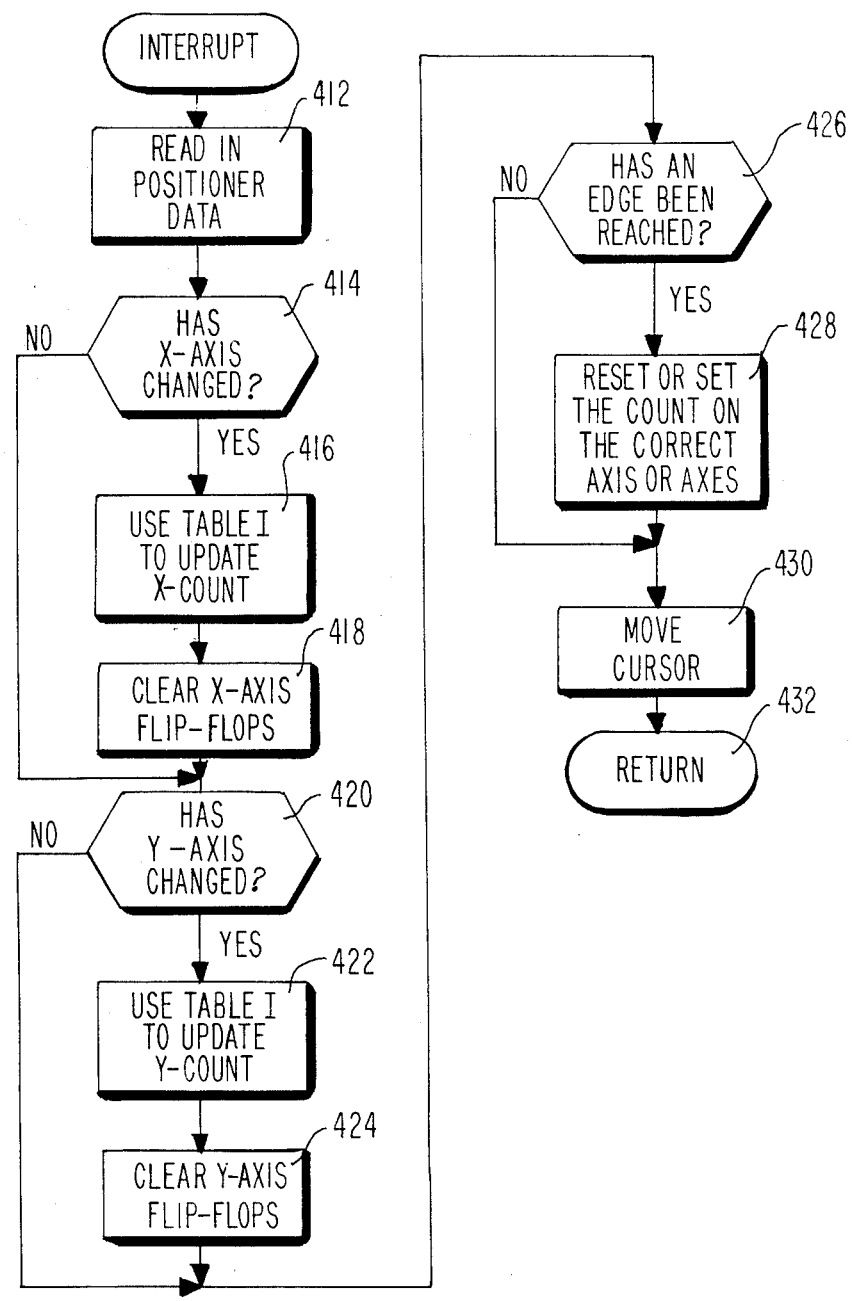
FIG. 14 is a flow diagram of a computer interrupt routine for controlling the position of a cursor in accordance with the device of FIG. 1.

An interrupt procedure, shown in FIG. 14, for the microcomputer circuit 314 is called upon the receipt of an interrupt signal from NOR gate 390. In a first step 412, the data on the lines 355, 388, 394, 396, 400, 402 and 404 are read by the microcomputer. In step 414, the computer compares the data on X position lines 355 and 394 with information previously stored about the previous state of these two lines. If this state has changed then the program proceeds to step 416 wherein Table I is utilized to update the X count. For example, if the previous recorded X data on lines 355 and 394 are AX=1 and BX=1 and the newly read data is AX=0 and BX=1, then the X count in RAM 410 is incremented. If the newly-read data is AX=1 and BX=0 then from Table I the X count is decremented to indicate the new position of the control device. From step 416, the program proceeds to step 418 where the microcomputer 314 pulses the line 406 to clear the flip-flops 356 and 360 as well as the corresponding flip-flops in the BX detector circuit 318. From step 418 or from step 414 if the X axis change is false, the program proceeds to step 420 where any change in the Y-position signals on lines 398 and 402 is determined. If there has been a change the program proceeds through steps 422 and 424 which are substantially similar to steps 416 and 418 except that the Y count and AY detector circuit 320 and BY detector circuit 322 are affected. From either step 420 if there is no change in the Y axis or from step 424, the program proceeds to step 426 where the state of lines 388, 396, 400 and 404 is determined. Any high on any of these lines indicates that the positioner is in the corresponding X max, X min, Y max, or Y min position. Thus, in the following step 428 the corresponding count or counts is either set to its maximum value or reset to its minimum value such as 0. From either step 426 if the positioner is not in a maximum or minimum position or from step 428 the program proceeds to step 430 where the cursor 310 is moved to the new position prior to returning at point 432 to the program where the interrupt occurred. Alternatively, the cursor moving step may be independent of interrupt procedure.

Incorrect counts resulting from false sensing of bit changes in the AX, BX, AY and BY signals of FIG. 13 may in most instances be ignored since the count will be corrected whenever the positioner reaches an edge and the positioning of the cursor by movement of the control in most instances is not affected by the count being slightly wrong. One particular situation which often causes miscounts occurs when the direction of the positioner is reversed, or the positioner is moved in the opposite direction after having stopped movement in one direction. Since the response of the light sensors to movement of the grating is generally sinusoidal, the reversal at most positions results in an immediate change or reversal in the direction of change in output of both light sensors. Since the circuitry of FIG. 13 operates upon such changes in signal, the A and B quadrature signals will both reverse substantially simultaneously. It is found that a more accurate count is produced by recognizing a complete reversal in the bits as a reversal in direction and ignoring a single bit change in the reverse direction. Table II sets forth memory addresses designated by the old and new bits and the old direction, and the corresponding data indicating action to be taken.

The N=1 indicates that the computer should substitute the new bits and direction AN, BN and NDIR for the old bits and direction A0, B0 and ODIR. The INC=0 indicates that the computer should increment the count by one. Thus, upon a reversal in direction, the computer recognizes the reversal of both bits A and B as indicating a reversal in direction of movement of the control to produce a substantially more reliable count of the position.

As shown in FIG. 13, the LED 252 is energized

TABLE II

| | Encoded Address | | | | | | Encoded Data | | | |
|---|---|---|---|---|---|---|---|---|---|---|
| Hex. | AN | BN | AO | BO | ODIR | Hex. | N | INC | DEC | NDIR | Action |
| 00 | 0 | 0 | 0 | 0 | 0 | 06 | 0 | 1 | 1 | 0 | nothing |
| 01 | 0 | 0 | 0 | 0 | 1 | 07 | 0 | 1 | 1 | 1 | nothing |
| 02 | 0 | 0 | 0 | 1 | 0 | 06 | 0 | 1 | 1 | 0 | nothing |
| 03 | 0 | 0 | 0 | 1 | 1 | 0B | 1 | 0 | 1 | 1 | INC |
| 04 | 0 | 0 | 1 | 0 | 0 | 0C | 1 | 1 | 0 | 0 | DEC |
| 05 | 0 | 0 | 1 | 0 | 1 | 07 | 0 | 1 | 1 | 1 | nothing |
| 06 | 0 | 0 | 1 | 1 | 0 | 0B | 1 | 0 | 1 | 1 | INC, ODIR=1 |
| 07 | 0 | 0 | 1 | 1 | 1 | 0C | 1 | 1 | 0 | 0 | DEC, ODIR=0 |
| 08 | 0 | 1 | 0 | 0 | 0 | 0C | 1 | 1 | 0 | 0 | DEC |
| 09 | 0 | 1 | 0 | 0 | 1 | 07 | 0 | 1 | 1 | 1 | nothing |
| 0A | 0 | 1 | 0 | 1 | 0 | 06 | 0 | 1 | 1 | 0 | nothing |
| 0B | 0 | 1 | 0 | 1 | 1 | 07 | 0 | 1 | 1 | 1 | nothing |
| 0C | 0 | 1 | 1 | 0 | 0 | 0B | 1 | 0 | 1 | 1 | INC, ODIR=1 |
| 0D | 0 | 1 | 1 | 0 | 1 | 0C | 1 | 1 | 0 | 0 | DEC, ODIR=0 |
| 0E | 0 | 1 | 1 | 1 | 0 | 06 | 0 | 1 | 1 | 0 | nothing |
| 0F | 0 | 1 | 1 | 1 | 1 | 0B | 1 | 0 | 1 | 1 | INC |
| 10 | 1 | 0 | 0 | 0 | 0 | 06 | 0 | 1 | 1 | 0 | nothing |
| 11 | 1 | 0 | 0 | 0 | 1 | 0B | 1 | 0 | 1 | 1 | INC |
| 12 | 1 | 0 | 0 | 1 | 0 | 0B | 1 | 0 | 1 | 1 | INC, ODIR=1 |
| 13 | 1 | 0 | 0 | 1 | 1 | 0C | 1 | 1 | 0 | 0 | DEC, ODIR=1 |
| 14 | 1 | 0 | 1 | 0 | 0 | 06 | 0 | 1 | 1 | 0 | nothing |
| 15 | 1 | 0 | 1 | 0 | 1 | 07 | 0 | 1 | 1 | 1 | nothing |
| 16 | 1 | 0 | 1 | 1 | 0 | 0C | 1 | 1 | 0 | 0 | DEC |
| 17 | 1 | 0 | 1 | 1 | 1 | 07 | 0 | 1 | 1 | 1 | nothing |
| 18 | 1 | 1 | 0 | 0 | 0 | 0B | 1 | 0 | 1 | 1 | INC, ODIR=1 |
| 19 | 1 | 1 | 0 | 0 | 1 | 0C | 1 | 1 | 0 | 0 | DEC, ODIR=0 |
| 1A | 1 | 1 | 0 | 1 | 0 | 0C | 1 | 1 | 0 | 0 | DEC |
| 1B | 1 | 1 | 0 | 1 | 1 | 07 | 0 | 1 | 1 | 1 | nothing |
| 1C | 1 | 1 | 1 | 0 | 0 | 06 | 0 | 1 | 1 | 0 | nothing |
| 1D | 1 | 1 | 1 | 0 | 1 | 0B | 1 | 0 | 1 | 1 | INC |
| 1E | 1 | 1 | 1 | 1 | 0 | 06 | 0 | 1 | 1 | 0 | nothing |
| 1F | 1 | 1 | 1 | 1 | 1 | 07 | 0 | 1 | 1 | 1 | nothing | wherein:
AN=the new A quadrature bit
BN=the new B quadrature bit
AO=the old A quadrature bit
BO=the old B quadrature bit
ODIR=old direction (1 = Up, 0 = Down)
NDIR=new direction (1 = Up, 0 = Down)
INC=increment the count when INC = φ
DEC=decrement the count when DEC = φ
N=store new bits AN, BN and NDIR as old bits (A0, B0 & ODIR) when N=1
nothing=no action taken In the program of FIG. 14, Table II will be utilized in steps 416 and 422 instead of Table I. In an example of use of the table it is assumed that the previous or old data bits are A0=0 and B0=0 and that the previous direction was down, ODIR=0. Now when the new bits are AN=1 and BN=0, this corresponds, as can be seen from Table I to movement in an up direction which is opposite to the previous direction. The computer utilizing AN, BN, A0, B0 and ODIR has an address in Table II and will read data N=0, INC=1, DEC=1 and NDIR=0. N=0 indicates to the computer that the new data bits and new direction are not to replace the old or previous data bits and direction. INC=1 and DEC=1 indicate that the counter is to be neither incremented or decremented. Thus, a change in a single bit AN or BN from the previously stored bits A0 and B0 which indicates a reversal in direction is ignored. Now assuming that the new bits are AN=1 and BN=1 the computer reads the data N=1, INC=0, DEC=1 and NDIR=1.

through a resistance 434 while the light sensor 256 is connected in series with a resistance 436. The non-inverting input of a comparator 438 is connected to the junction of the sensor 256 and the resistance 436, while its reference input is connected to the junction 366. When the positioner member 60 is depressed to move the guillotine member 156 downward, light from the LED 252 impinging on the light sensor 256 is interrupted. This results in operation of the comparator 438 to produce a high on switch indicating line 440 connected to the microcomputer circuit 314. The microcomputer circuit may include interrupt called procedures (not shown) or dwell time procedures (not shown) for monitoring line 442 to determine when the switch line 440 goes high. This switch action can be used for program selection, symbol placement selection, etc., as normally done by various switches in computer circuits.

Figure 15:
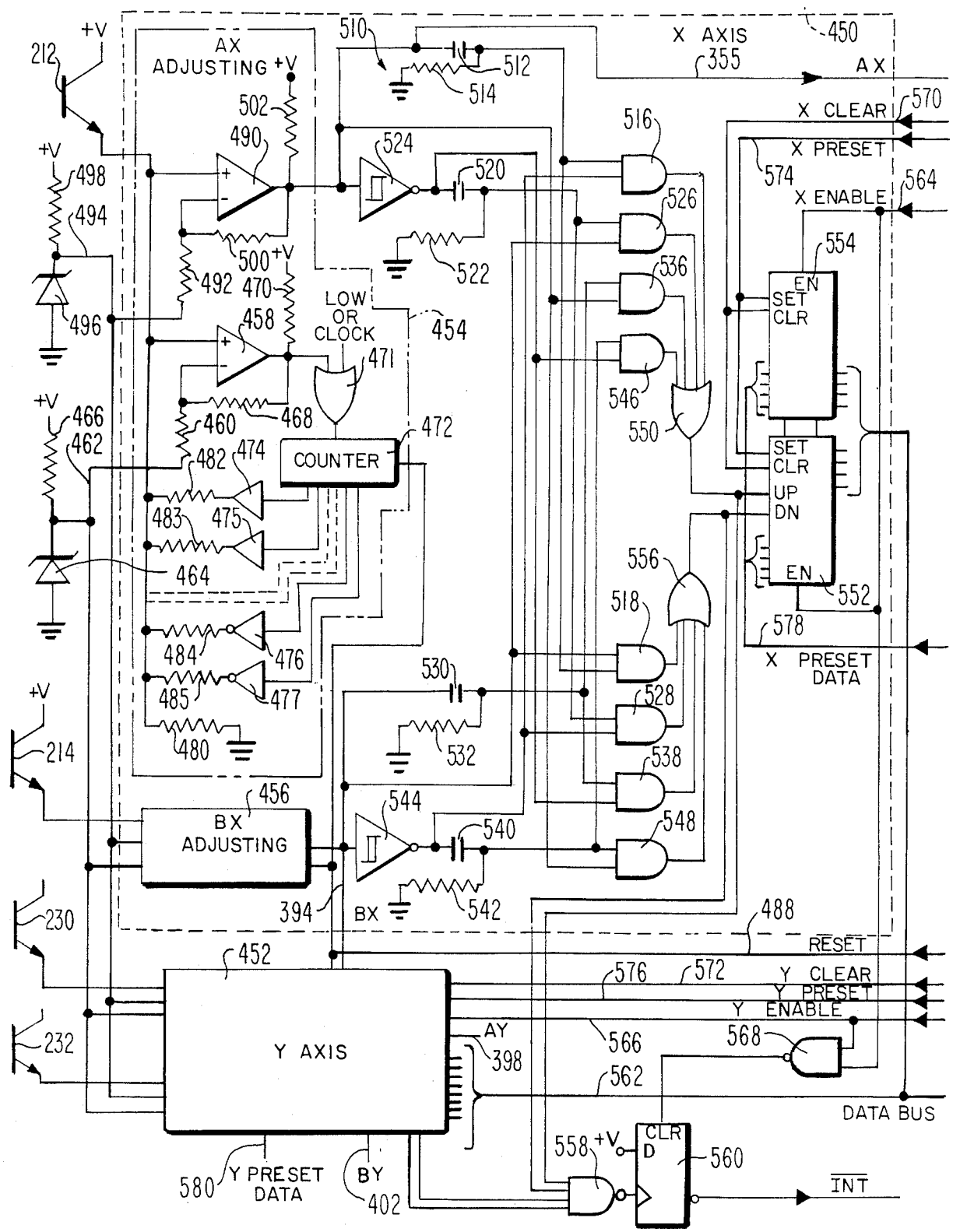
FIG. 15 is an electrical circuit diagram of a modification to the circuit of FIG. 13 for indicating position of a control device.

A DC-type interface circuit for the sensors 212, 214, 230 and 232 is illustrated in FIG. 15 and includes X axis determining circuitry within the dashed box 450 and Y axis determining circuitry 452 which is substantially identical to the X axis circuitry 450. In the X axis circuit 450, there is included an AX adjusting circuit shown by the double short and single long dashed box 454 and a BX adjusting circuit 456 which is substantially identical to the AX adjusting circuit 454. In the AX adjusting circuit, the output of the light sensor 212 on its emitter is connected to an inverting input of a comparator 458 which has its reference input connected by a resistance 460 to a reference voltage source terminal 462 determined by a zener diode 464 energized through a resistance 466 to the +V source. The comparator 458 includes a negative feedback resistance 468 and has its output biased toward +V through resistance 470. The output of the comparator 458 is connected to one input of an OR gate 471 which has its other input either connected to a clock signal or biased low. The output of the OR gate 471 is connected to an input of a binary counter 472 which has its outputs connected to inputs of respective inverters 474, 475, 476 and 477. The counter can have any number of stages with four or eight stages being preferred to control four (shown in FIG. 15) or eight series inverter-resistance circuits such as the circuits formed by inverters 474-477 and resistances 482-485. The output on the emitter of the light sensor 212 is connected in series with a resistance 480 to ground and by respective resistances 482, 483, 484 and 485 to the outputs of the respective inverters 474, 475, 476 and 77. The resistances 480, 482, 483, 484, and 485 determine the gain of the phototransistor 212 wherein the value of resistance 480 by itself normally produces a gain or DC level which results in peak voltages exceeding the reference voltage on line 462. When the counter 472 is in its reset condition, for example, after a reset signal from the computer circuitry on line 488, the counter outputs will be low rendering the outputs of inverters 474-477 high, and when one or more outputs of the counter 472 are high, the output of the corresponding inverter or inverters 474-477 are low to connect the corresponding resistance or resistances 482-485 in parallel with the resistance 480. The values of the resistances 482-485 are selected to produce suitable adjustment, such as linear adjustment in accordance with successive counts of the counter 472, of the resistance connected between the emitter of phototransistor 212 and ground. The emitter of phototransistor 212 is also connected to an input of a comparator 490 which has its reference input connected by a resistance 492 to a voltage reference line 494 from a zener diode 496 connected in series with a resistance 498 across the +V voltage source. The comparator 490 includes a negative feedback resistance 500. A resistance 502 from the +V source is connected to the output of the comparator 490 which is joined to the AX signal line 355. The value of the zener diode 496 is selected to be about one-half of the value of the zener diode 464.

In operation of the AX adjusting circuit 454, modulated light signals applied to the light sensor 212 produce corresponding voltage signals across resistance 480 which are applied to the inputs of the comparators 458 and 490. When these voltage signals exceed the voltage rating of zener diode 464, the comparator 458 produces a low output enabling the clock signals, or produces a low pulse, to step the counter 472 to connect one or more of the resistances 482-485 in parallel with the resistance 480 and thus reduce the magnitude of the voltage produced across the resistance 480. In this manner the gain of the phototransistor 212, or DC level across the resistances, is automatically set to a standard value in spite of the fact that the parameters of the phototransistor 212 may vary considerably from standard or average values. Thus, the output of the comparator 490 will accurately reflect the signal AX. Similarly, the BX signal on line 394 will be an accurate representation of the corresponding grating position.

When high speed clock pulses are applied through the OR gate 471, the DC gain of phototransistor 212 is rapidly adjusted downward from its maximum gain until the voltage output of sensor 212 no longer exceeds the reference voltage 462. If the clock input is held low or the OR gate 471 is eliminated than only one step adjustment of counter is provided for each pulse from comparator 458. Besides eliminating the need for extensive finger element movement to reduce the gain to the proper value, the employment of the clock also enables DC gain adjustment when component parameters produce an initial gain where the signal from sensor 212 never falls below the reference voltage 462.

The X axis determining circuit 450 also includes a logic and counting circuit indicated generally at 510. A differentiator circuit formed by capacitance 512 and series resistance 514 to ground is connected to the AX line 355 for producing an output pulse which is applied to inputs of AND gates 516 and 518 when the AX line goes from low to high. A second differentiator circuit formed by a capacitance 520 and a series resistance 522 to ground is connected to the output of a Schmidt trigger inverter 524 which has its input connected to the AX line 355 so that the differentiator produces a pulse when the AX lines goes from high to low to apply a pulse to AND gates 526 and 528. A differentiator circuit formed by capacitance 530 and resistance 532 to ground is connected to the BX line 394 for producing a pulse when the BX line goes from low to high to apply a pulse to AND gates 536 and 538. A differentiator circuit formed by capacitance 540 and resistance 542 to ground is connected to the output of a Schmitt trigger inverter 544 which has its input connected to the BX line 394 for producing a pulse from the differentiator circuit which is applied to inputs of AND gates 546 and 548. Second inputs of AND gates 516 and 528 are connected to the inverted BX output of Schmitt inverter 544. Second inputs of AND gates 526 and 518 are connected to the XX line 394. Second inputs of AND gates 536 and 548 are connected to the AX line 355. Second inputs of AND gates 546 and 538 are connected to the inverted AX output of Schmitt inverter 524. Outputs of AND gates 516, 526, 536 and 546 are connected to respective inputs of an OR gate 550 which has its output connected to the up counting input of a counter formed by suitably interconnected counter chips 552 and 554. Outputs of AND gates 518, 528, 538 and 548 are connected to inputs of a OR gate 556 which has its output connected to the down counting input of the counter.

In operation of the logic and counting circuit 510, the count contained in the counter formed by units 552 and 554 is stepped up or down in accordance with the Table I when a change in state of the signals on line AX and BX occurs. This logic and counting circuit replaces the need for the computer program steps 416 of FIG. 14 to use Table I to update and maintain an X count in RAM.

The Y axis circuit 452 in a manner substantially identical to the circuit 450 maintains a Y axis count. The up and down counting signals from OR gates 550 and 556 of the circuit 450 along with corresponding up and down signals from the circuit 452 are applied to corresponding inputs of a NAND gate 558 which has its output connected to a flip-flop 560. Thus, any change in the X axis count or Y axis count operates flip-flop 560 which produces an output on interrupt line to the computer. AX line 355, BX line 394, AY line 398 and BY line 402 may also form inputs to the computer. The X count and the Y count in the circuits 450 and 452 are selectively applied to the data bus 562 by the computer generating signals on the respective X enable line 564 and Y enable line 566. Enable signals on either line 564 or 566 are applied by a NAND gate 568 to the clear input of the flip-flop 560 to clear the interrupt signal. X clear and Y clear signals can be selectively applied to lines 570 and 572 to clear the counts in the X axis circuit 450 and Y axis circuit 452, respectively, to indicate the respective X min and Y min positions of the cursor control. Similarly, X max and Y max position sensing by the computer results in corresponding signals on X preset line 574 and Y preset line 576 which results in setting of the counts in the counters of the respective circuits 450 and 452 to the signals presented on X preset data lines 578 and Y preset data lines 580, respectively. The data lines 578 and 580 may represent hard wired circuitry or may be connected to the data bus by a driver circuit (not shown) operated by the computer.

Figure 17:
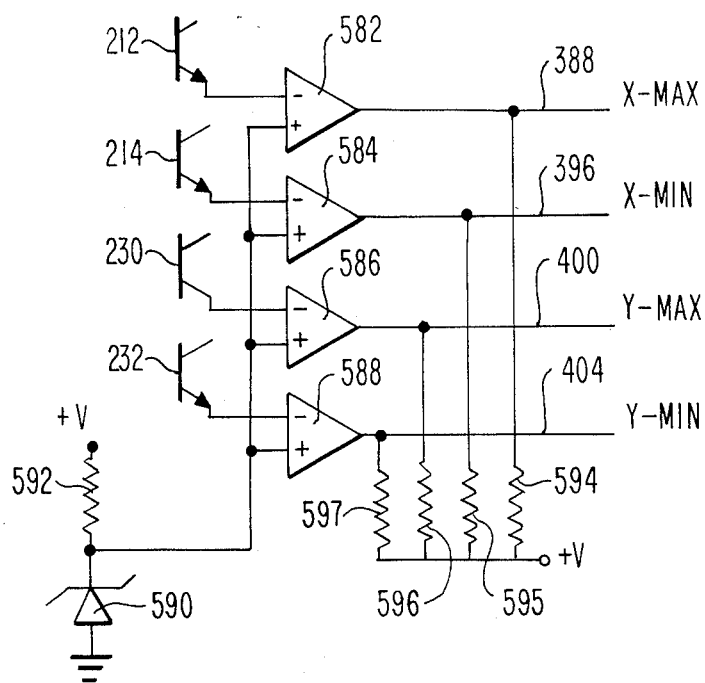
FIG. 17 is an electrical diagram of edge detection circuitry suitable for use with the circuit of FIG. 15.

As shown in FIG. 17, a circuit which is included with the circuitry of FIG. 15 for generating the X max, X min, Y max and Y min on the respective lines 388, 396, 400 and 404 to the computer includes comparators 582, 584, 586 and 588 which have inputs connected to the emitters of the respective phototransistors 212, 214, 230 and 232. The reference inputs of the comparators 582, 584, 586 and 588 are connected to a zener diode 590 energized by a resistance 592 to the +V source for producing a reference voltage which is between the voltage levels 382 and 384 of FIG. 8. Bias resistances 594, 595, 596 and 597 are connected between the +V voltage source and the outputs of the respective comparators 582, 584, 586 and 588.

Circuitry shown in FIG. 12 illustrates an additional possible way of producing max and min signals from sensing the edge portions of the gratings such as the edge portion 374 of the grating 182. The light emitting diodes such as diodes 190 and 192 are connected on the positive sides of the current limiting reistances 270 and 272. Resistances 602 and 604 are connected at one ends to the respective junctions between the diodes 190 and 192 and resistances 270 and 272, and at the opposite ends to outputs of respective inverters 606 and 608 which have their inputs connected to a line 610 normally driven high so as to connect the resistances 602 and 604 in parallel with the resistances 270 and 272 producing normal light from the LEDs 190 and 192. When a negative going pulse is applied to the line 610, the outputs of the inverters 606 and 608 go high which results in a substantial dimming of the light emitting diodes 190 and 192. Where the corresponding opening, such as opening 208, is not covered by an edge portion, this dimming of light causes a substantial change in the conductivity of the corresponding light sensors such as light sensor 212. Where the circuit includes differentiating circuitry or voltage change detecting circuitry such as that previously described including amplifiers 324 and 330, the output of such voltage change circuitry produces a pulse, in the present case a positive pulse which will detected by a comparator 612 which has its reference input connected to a zener diode 614 driven by current through a resistance 616. The output of the comparator 612 goes high when the pulse appears from amplifier 324 to produce a pulse on the X min line 396 which can be detected by the computer. In the upper circuit wherein the opening 210 is covered by the edge portion 374, the dimming of the LED 192 does not produce any substantial change in the conductivity of the light sensor 214. Thus the comparator 618 connected to the upper voltage change sensing amplifier 324 does not produce a pulse on the X max line 388 which indicates to the computer that the edge 374 covers the opening 210.

Figure 16:
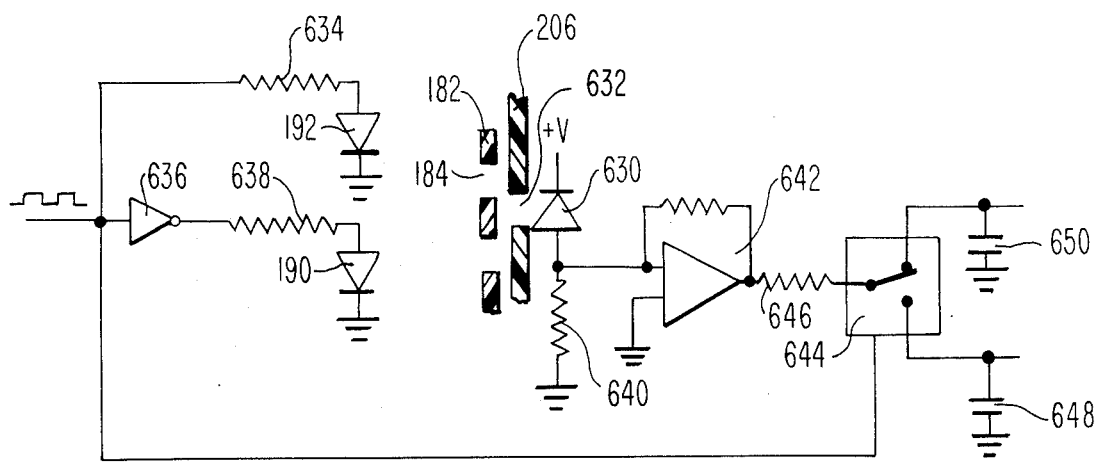
FIG. 16 is an electrical diagram illustrating the employment of another modified detector and light source arrangement for detecting grating movement.

In a variation shown in FIG. 16, a single light sensing element or diode 630 positioned by a single opening 632 in the wall 206 of the insert 202, FIG. 3, is utilized to generate both quadrature related signals. In this embodiment, the LEDs 190 and 192 are alternately driven by a circuit from a alternating square wave source which is applied through resistance 634 to the diode 192 and through inverter 636 and resistance 638 to the diode 190. The energizing square wave has a frequency which is at least twice a normal maximum rate of movement of cycles of the grating 182 past the opening 632. The spacings of the diodes 190 and 192 from each other and from the grating 182 as well as the width of the openings 184 and the separating bar sections therebetween and the width and spacing of the opening 632 from the photosensitive diode 630, as well as the spacing between the grating 182 and the wall 206 are selected so that modulation of light by the grating 182 from the respective diodes 190 and 192 produces quadrature related signals. The output of the light sensitive diode 630 across a resistance 640 is amplified by an amplifier 642 and applied to an analog switching circuit 644 by a resistance 646. The analog gate 644 is operated by the alternating square wave to produce corresponding signals which are filtered such as by capacitances 648 and 650 to produce respective signals which can be converted into corresponding AX and BX signals.

Figure 18:
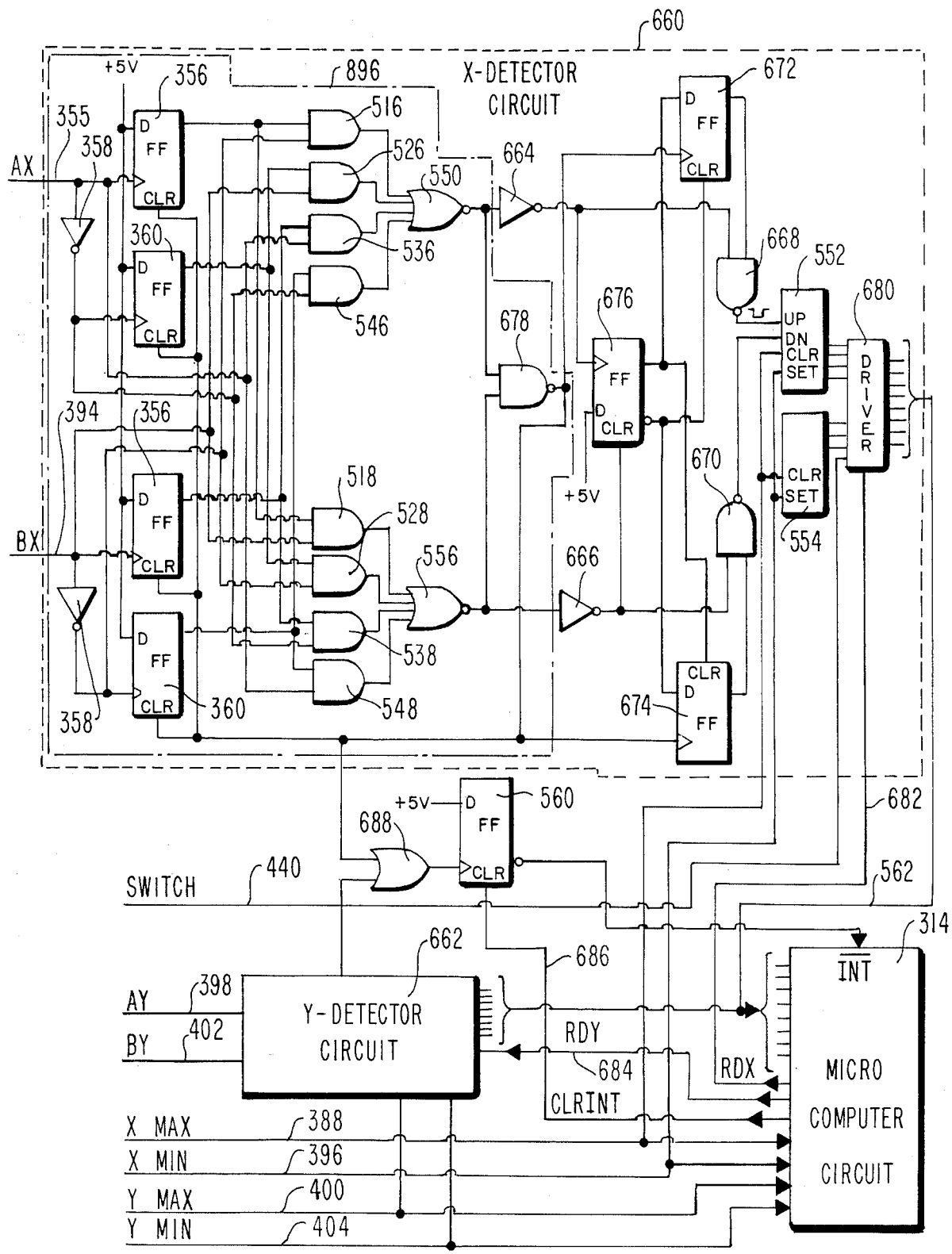
FIG. 18 is an electrical diagram of still another modification to the control circuit of FIG. 13.

A modification to the circuit of FIG. 13 is illustrated in FIG. 18 which includes logic and counting hardware to relieve the computer of the procedures for maintaining a position count. The circuit of FIG. 18 includes an X detector circuit enclosed within the dashed box 660 which receives the AX and BX signals on the respective lines 355 and 394 from the circuitry of FIG. 13, and a Y detector circuit 662 which contains circuitry substantially identical to the circuit 660 and receives the AY and BY signals on respective lines 398 and 402 from the circuit of FIG. 13. In the X detector circuit 660, the AX signal is applied to the flip-flop 356 and by inverter 358 to flip-flop 360 in a manner similar to that of FIG. 13. However, the outputs of the flip-flops 356 and 360 are connected to logic AND gates 516, 526, 536, 546, 518, 528, 538 and 548 in a manner similar to the connections made to these logic gates to produce respective up and down signals from NOR gates 550 and 556 in FIG. 15. However in the circuit of FIG. 18, the outputs of the NOR gates 550 and 556 are applied through respective inverters 664 and 666 to inputs of respective NAND gates 668 and 670 which have their inputs controlled by outputs of respective direction flip-flops 672 and 674. The flip-flops 672 are set in accordance with the respective non-inverted and inverted outputs of a flip-flop 676 which is set by the output of inverter 664 and reset by the output of inverter 666. The clock input of the flipflops 672 and 674 is supplied by the output of a NAND gate 678 which has its inputs from the outputs of NOR gates 550 and 556. The output of the NAND ate 678 is also connected to the clear inputs of the flip-flops 356 and 360. In operation of the X detector circuit, the up and down signals from the respective inverters 664 and 666 are passed by the respective NAND gate 668 and 670 to the corresponding up and down inputs of the counter formed by units 552 and 554 only when the corresponding flip-flop 672 or 674 is set indicating a previous up or down. The flip-flop 672 or 674 is set only when the previous pulse occurred to set or reset, respectively, flip-flop 676 to permit the output of NAND gate 678 to thus set the corresponding flip-flop 672 and 674. This circuitry prevents counting of the first pulse occurring after a reversal in the change of direction.

The outputs of the counting units 552 and 554 along with the switch line 440 are connected by a bus driver unit 680 to the computer data bus 562. The count in the counting units 552 and 554 is applied to the microprocessor data bus when a signal is applied over the read X line 682. Similarly, the Y address in the Y detector circuit 662 is applied to the computer data bus 562 when the microcomputer circuit 314 applies a signal to read Y line 684. The interrupt of the computer circuit 314 is driven by the inverted output of a flip-flop 560 which is set by the output of an OR gate 688 having inputs from the outputs of NAND gate 678 of the X detector circuit 660 and the Y detector circuit 662. The flip-flop 560 is cleared by a signal on a clear interrupt line 686 from the microcomputer circuit 314.

Figure 19:
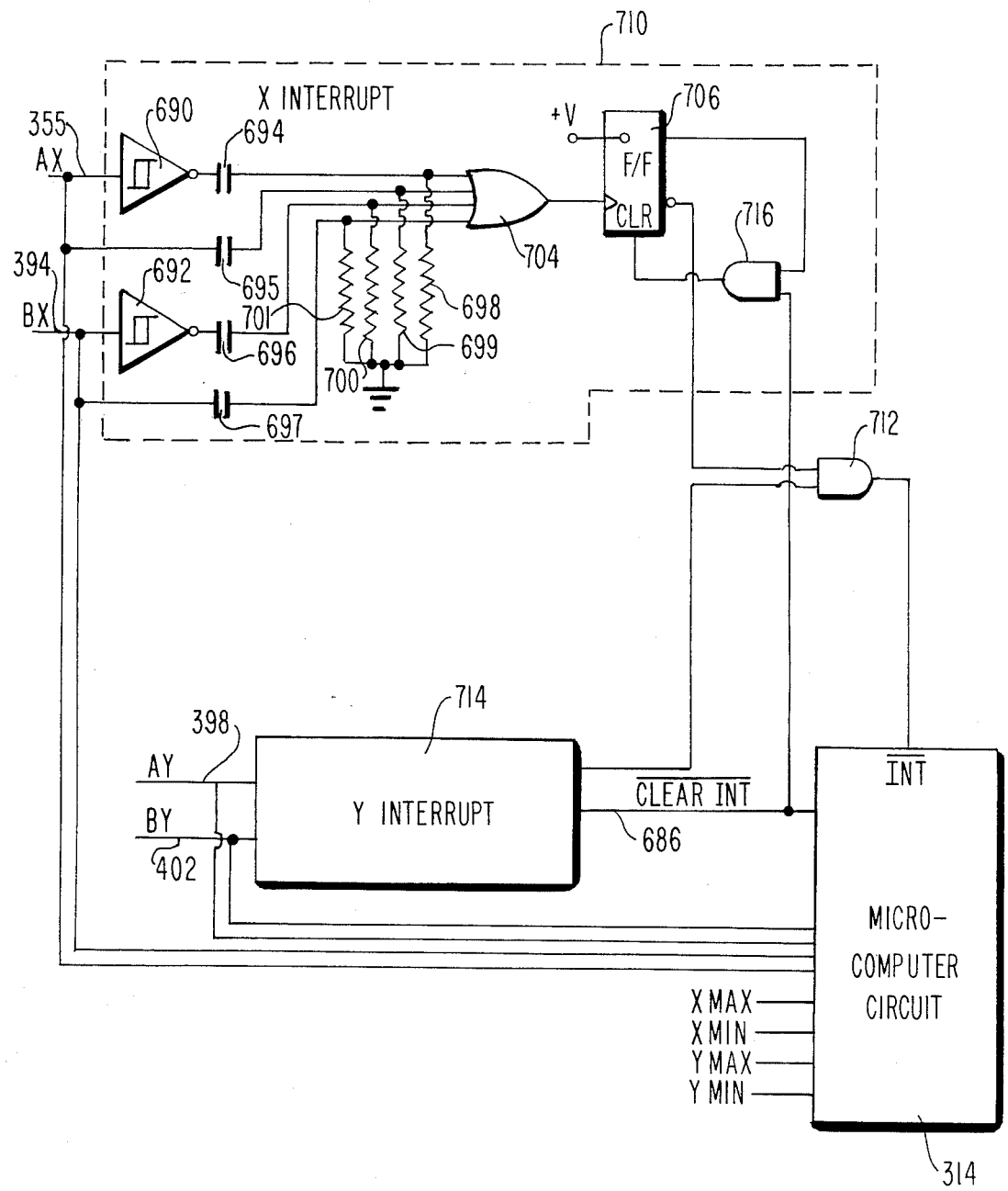
FIG. 19 is an electrical diagram of a variation of interrupt circuitry for the control circuit.

Interrupt circuitry shown in FIG. 19 can be used as an alternative to interrupt circuitry of the circuit in FIG. 13 in order to produce a lower total chip count of the circuitry. In this alternative interrupt circuitry, the AX signal on line 355, the BX signal on line 394, the inverted AX signal from the output of a Schmidt trigger inverter 690 and the inverted BX signal from the output of a Schmidt trigger inverter 692 are applied to respective differentiating circuits formed by capacitors 694, 695, 696 and 697 and resistors 698, 699, 700 and 701 to ground. The voltages across the resistances are applied to respective inputs of a NOR gate 704 which has its output connected to a X interrupt flip-flop 706. The inverted output of the flip-flop 706 in the interrupt circuit shown in the dashed box 710 is applied to one input of an AND gate 712 which has its other input connected to the corresponding interrupt flip-flop of the Y interrupt circuit 714 which is substantially identical to the circuit 710. The X and Y interrupts are cleared by a signal on the clear interrupt line 686 which is applied through AND gate 716 to the flop-flops 706.

Figure 20:
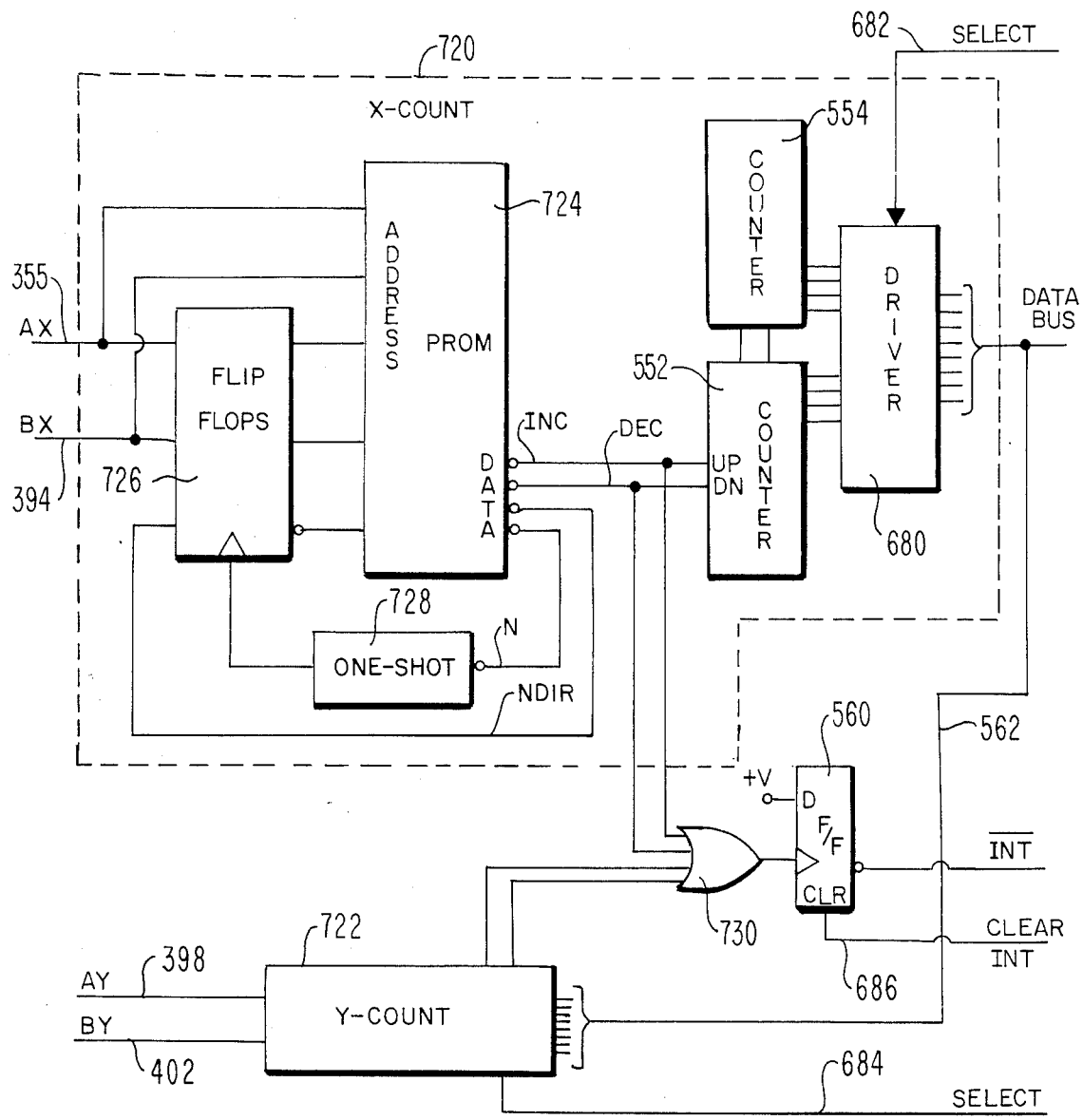
FIG. 20 is an electrical diagram of still yet another modification for the control circuit.

In FIG. 20 there is illustrated a hardware implementation of the table analyzing and counting functions of the circuit in FIG. 13 in accordance with Table II. An X count circuit within the dashed box 720 and a Y count circuit 722 which is substantially identical to the X count circuit 720 include a prom 724 which contains the data of Table II, i.e., N, INC, DEC and NDIR at the addresses thereof. The address inputs to the X count prom are connected to the AX line 355, BX line 394, and respective outputs of a triple flip-flop unit 726 which contains the old AX and BX signals as well as the old direction. The data called by the address is generated on the data outputs INC, DEC, NDIR and N wherein INC and DEC are only pulsed when the corresponding data bit is 0 to decrement the counter formed by counter units 552 and 554. A one shot 728 is operated by the output N when the corresponding stored N value is 1 to apply a pulse to the clock input of flip-flops 726 and store the new AX, BX and direction data bits in the flip-flops 726. The INC and DEC lines from the X count circuit 720 and from the Y count circuit 722 are applied to respective inputs of an OR gate 730 which sets the interrupt flip-flop 560. Read-out of the count and clearing of the interrupt ocur in the same manner as described in connection with FIG. 18.

Figure 21:
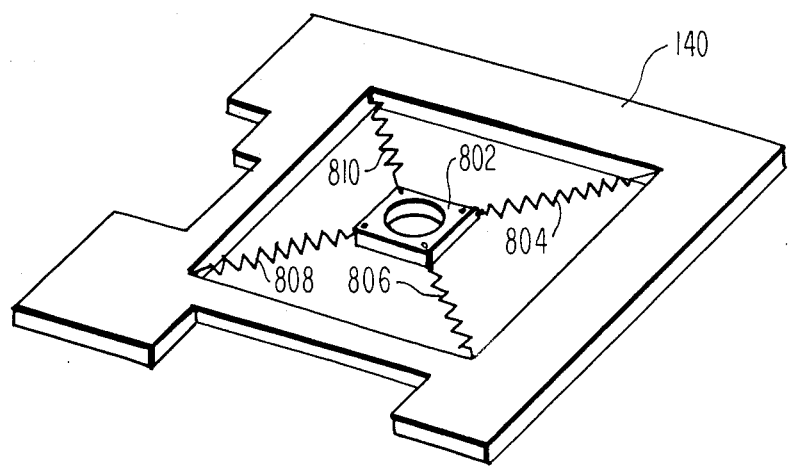
FIG. 21 is a perspective view of a modified cover with a center return spring arrangement for substitution in the device of FIG. 1.
Figure 22:
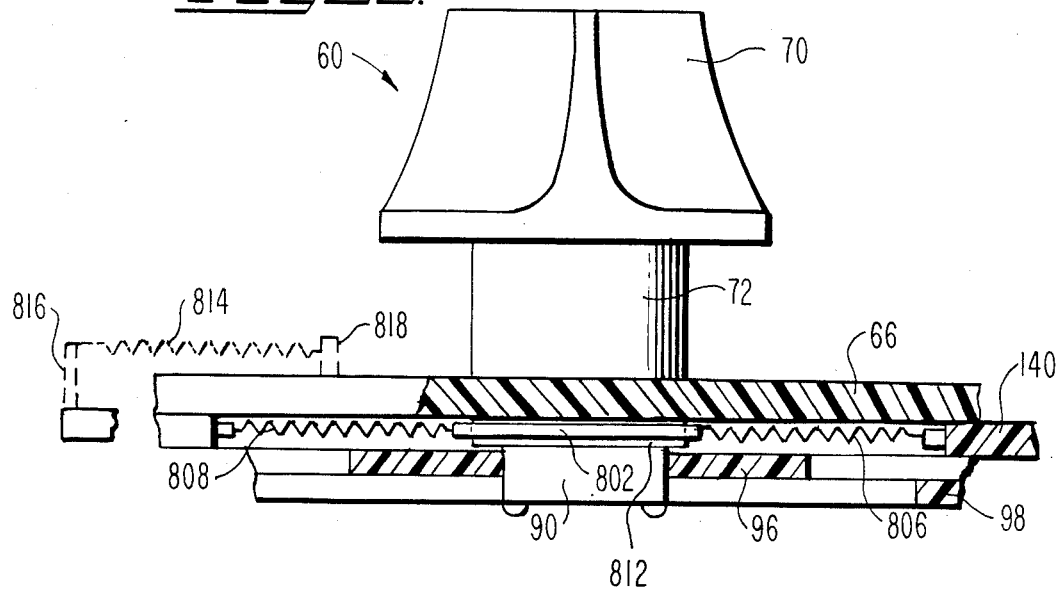
FIG. 22 is a broken-away cross-section view, in elevation, illustrating the employment of the center return arrangement of FIG. 21 in the device of FIG. 1.

In one variation of the control in accordance with the invention, the finger engaging member 60, FIG. 1, together with the plate 66 may be spring-biased to return to a centered position. A preferred modification is shown in FIG. 21 wherein the cover 140 has a collar member 802 biased in a center position by four springs 804, 806, 808 and 810, extending from corners of the central opening in the cover 140. As shown in FIG. 22 this collar 802 is engaged upon a downward extension 812, see also FIG. 4, from the plate 66. When the finger member 60 is released the springs 804, 802, 808 and 810 return the finger member 60 to a central position.

Alternatively, as shown in dashed lines, springs 814 may be mounted between pins 816 on the corners of the cover 140 and pins 818 on the plate 66 (only one set of four sets of springs 814 and pins 816 and 818 shown) for centering the control 60 in the same manner as the springs 804, 806, 808 and 810.

Figure 23:
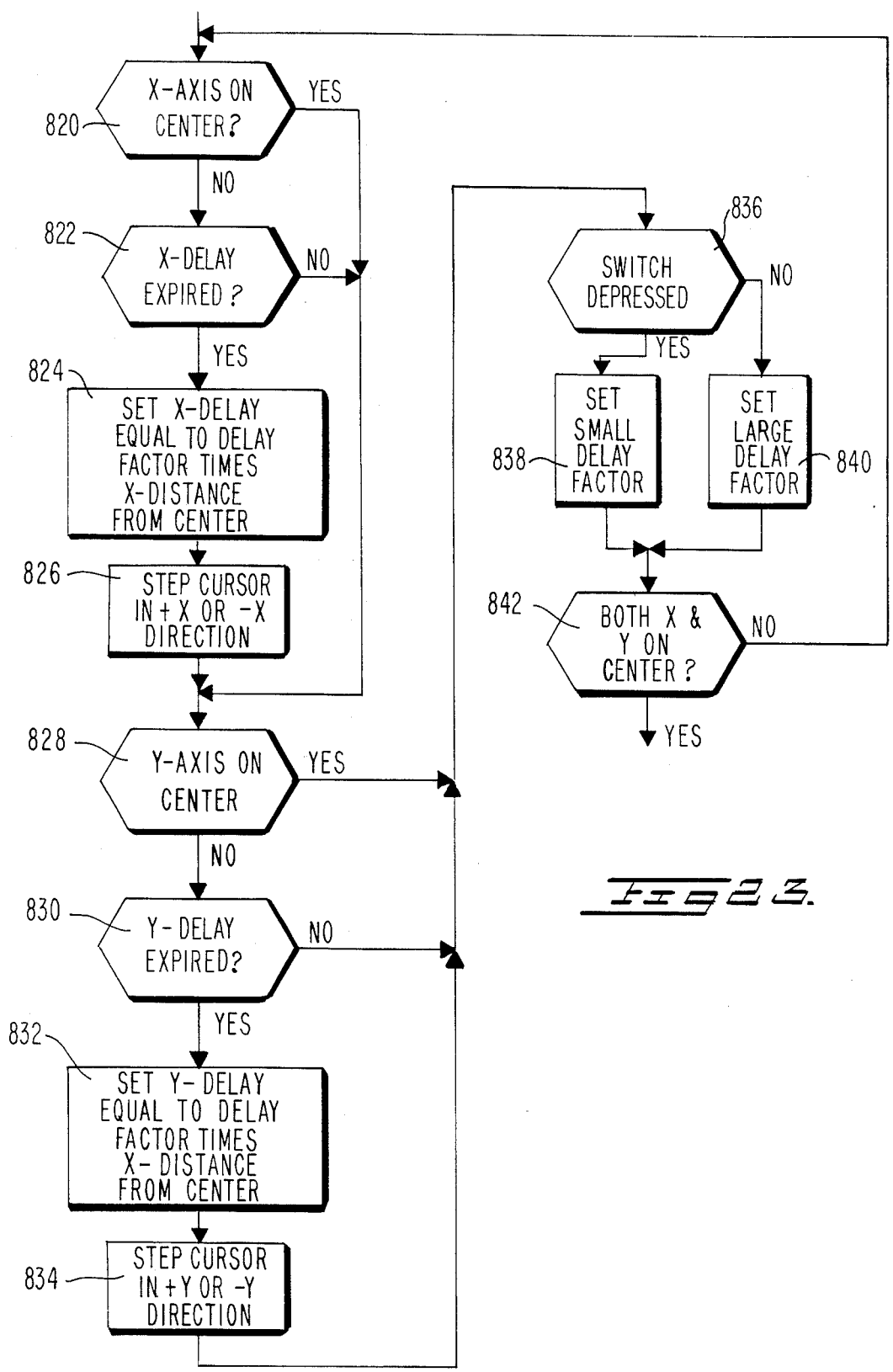
FIG. 23 is a flow diagram of a modification to the routine of FIG. 14 for use with the modification of FIGS. 21 and 22.

In FIG. 23 there is shown a computer program procedure which can be substituted for the cursor moving step 430 of FIG. 14 when utilizing the center return control of FIGS. 21 and 22. In a first step 820 the computer determines whether the control is within the center position by comparing the present count or register value for the X axis with a window of values defining the center position. If the X axis is not on the center position, then the program proceeds to step 822 where the expiration of a X delay value is determined. If this X delay value has expired the program proceeds to step 824 where the X delay value is again set equal to a delay factor times the X distance from the center. In the following step 826 the computer will step the cursor in a +X or −X direction corresponding to whether the control 60 is to the right or left of the center. If step 820 is true, if step 822 is false, or from step 826, the program proceeds to step 828 and the following steps 830, 832 and 834 which are substantially similar to steps 820, 822, 824 and 826 except that the steps 828, 830, 832 and 834 concern the Y axis instead of the X axis.

In the next step 836, the computer determines if the switch, button 70, has been depressed. If the button 70 is depressed the computer in step 838 sets a small delay factor which results in rapid movement of the cursor in X and Y directions. If button 70 is not depressed the program in step 840 sets a large delay factor which results in slower movement of the cursor. From step 838 or 840 the program proceeds to step 842 where centering in both X and Y directions is determined. If the control 60 has not returned to the center position, the program returns to the first step 820. Otherwise the program will exit the procedure of FIG. 23.

Figure 24:
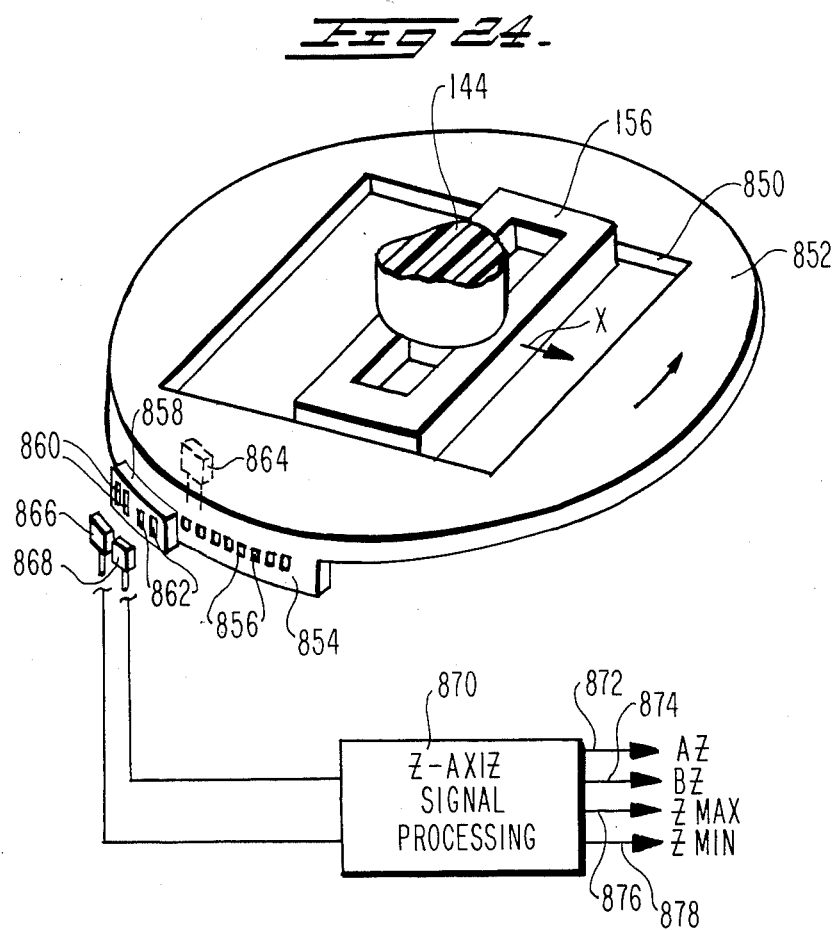
FIG. 24 is a perspective view of a broken-away portion of a third axis or rotation sensor arrangement which may be included in the device of FIG. 1.

As shown in FIG. 24 the control can be readily modified to include an additional rotative or Z axis sensor in addition to the X and Y axis sensing. In this modification the pin 144 will be fixed to the cap 70 (FIG. 2) which will be permitted to rotate, and the guillotine member 156 will be slidable in the X direction within an opening 850 in a disc member 852 which is suitably mounted for rotation in the control housing Rotation of the button 70 will rotate the pin 144 and guillotine member 156 along with the disc 852. The disc 852 contains a depending skirt 854 which contains a grating formed by evenly spaced vertical slots 856 which are similar to the slots 184 and 226 of the members 98 and 96. An insert or mask member 858 has two pairs of openings 860 and 862 which are similar to the openings 208 and 210 of the insert 202 for producing a quadrature phase related modulation of light from the openings 860 and 862 when the skirt 854 is rotated past the member 858. An LED 864 is mounted on the inside of the skirt 854, while a pair of light sensing elements 866 and 868 are mounted adjacent the mask 858 for sensing the light passing through the respective pairs 860 and 862 of openings in the member 858. The light sensers 866 and 868 are connected to a Z axis signal processing circuit 870 which includes circuitry substantially identical to one of the circuits of FIGS. 13, 15, 16 and/or 17 to produce an AZ signal on line 872, a BZ signal on line 874, a Z max signal on line 876 and a Z min signal on line 878 in a manner similar to the generation of AX, BX, X max and X min signals.

Figure 25:
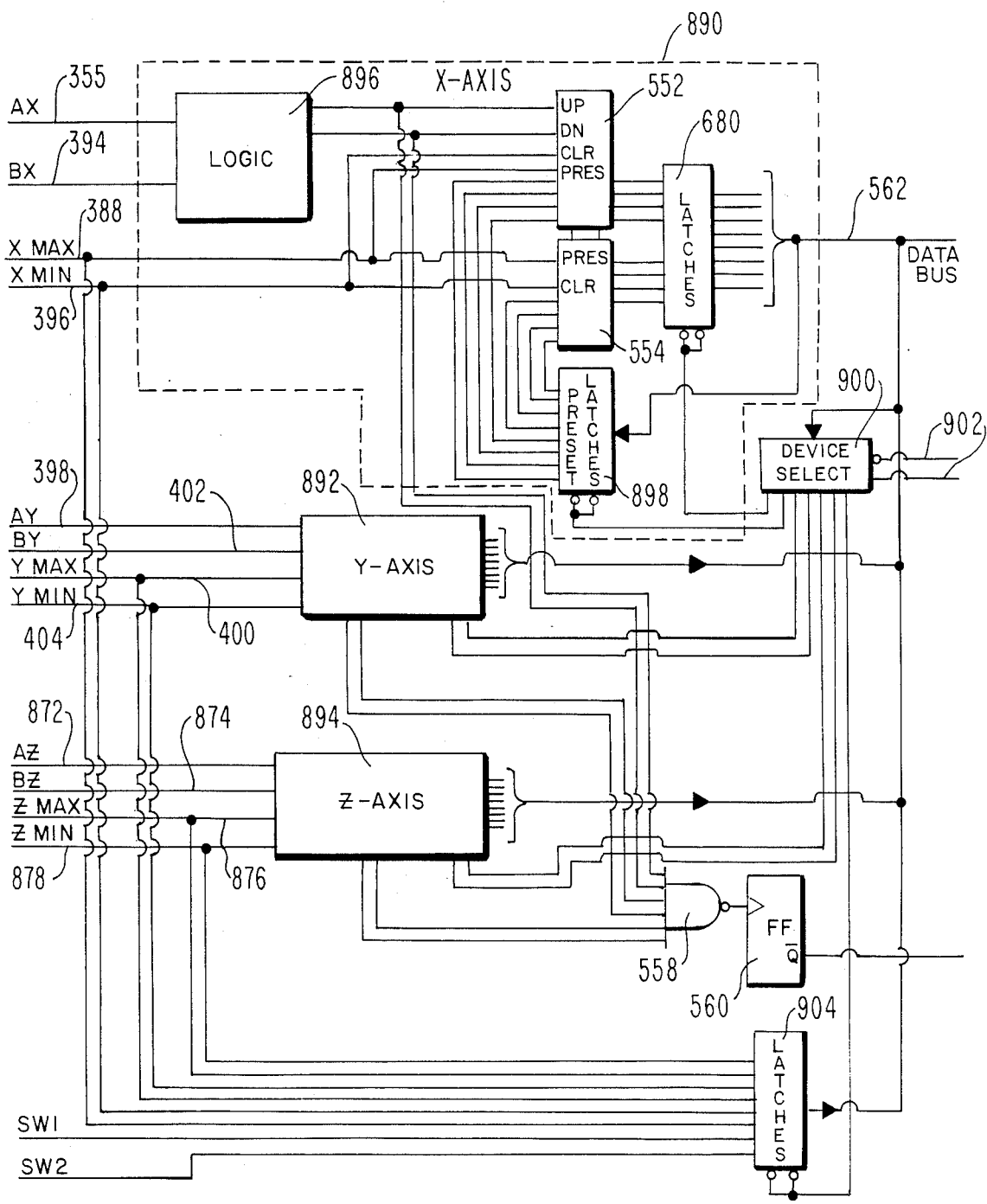
FIG. 25 is an electrical diagram of another further modification to the circuit for determining the positioning of the control device of FIG. 1 as modified by FIG. 24.

The control circuit of FIG. 25 includes an X axis logic and counting circuit 890 along with Y axis logic and counting circuit 892 and a Z axis logic and counting circuit 894, the circuits 892 and 894 being substantially identical to the circuit 890. The X axis processing circuit 890 includes a logic circuit 896 which is substantially identical to that shown in the long and short dashed box 896 of FIG. 18. Up and down signal outputs of this logic circuit operate the counter formed by counting units 552 and 554 which have outputs selectively connectable to the data bus 562 by a driver or latches circuit 680. The circuit 890 also includes preset latches circuit 898 which can be loaded with a preset data from the data bus 562 which is then utilized to load the maximum count in the counting units 552 and 554 when the X max signal is received on line 388.

A device select circuit unit 900 is selected by lines 902 from the computer to read data through latches 680 and to write data into latches 898 in the corresponding circuits 890, 892 and 894. Additionally the device select unit 900 can operate a latches circuit 904 to read data from the X max line 388, X min line 396, Y max line 400, Y min line 404, Z max line 876 and Z min line 878 along with two additional lines identified by SW1 and SW2 corresponding to optional switches. For example SW1 can be the switch line 440, FIG. 13, and SW2 can be a rotative switch line as described below. In one particular embodiment the circuitry of FIG. 25 is included on a single logic array circuit chip enabling a substantial reduction in the chip count of the circuitry for the computer control.

Figure 26:
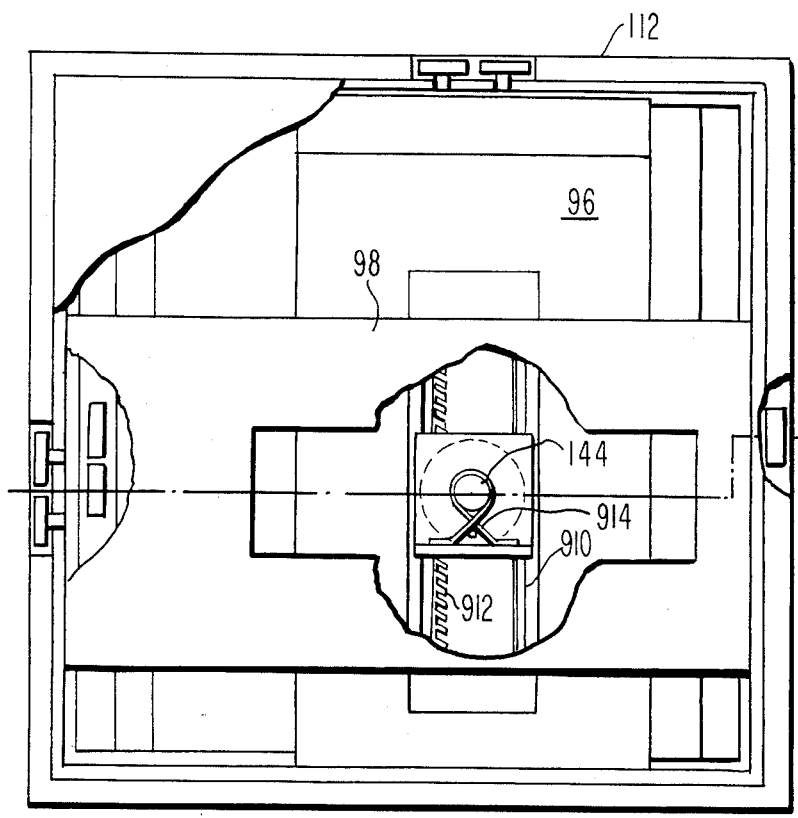
FIG. 26 is a top view with portions broken-away of variation of the control of FIG. 1 with 9 variations of the rotational or third axis sensor arrangement.
Figure 27:
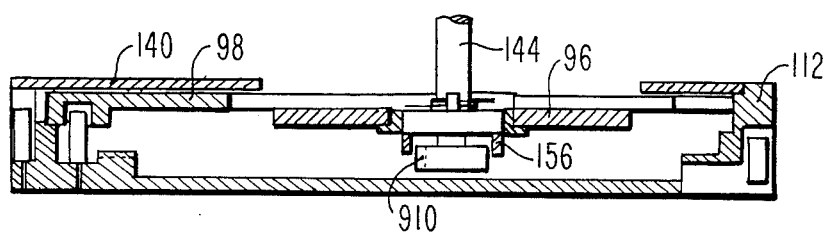
FIG. 27 is an elevational section of the device of FIG. 26.
Figure 28:
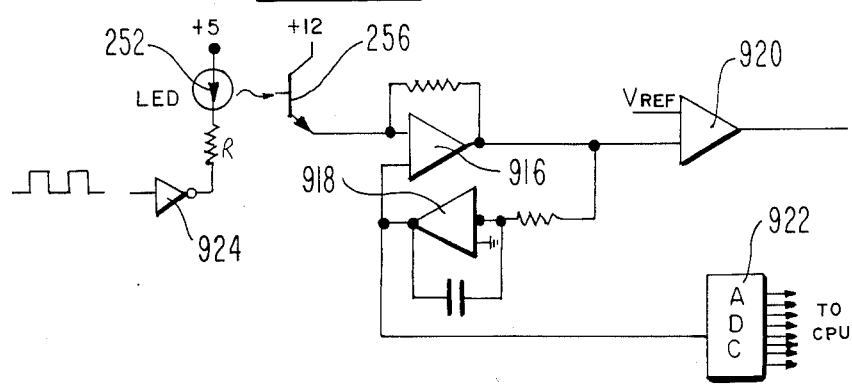
FIG. 28 is an electrical schematic of a circuit for the third axis sensing arrangement of FIGS. 26 and 27.
Figure 29:
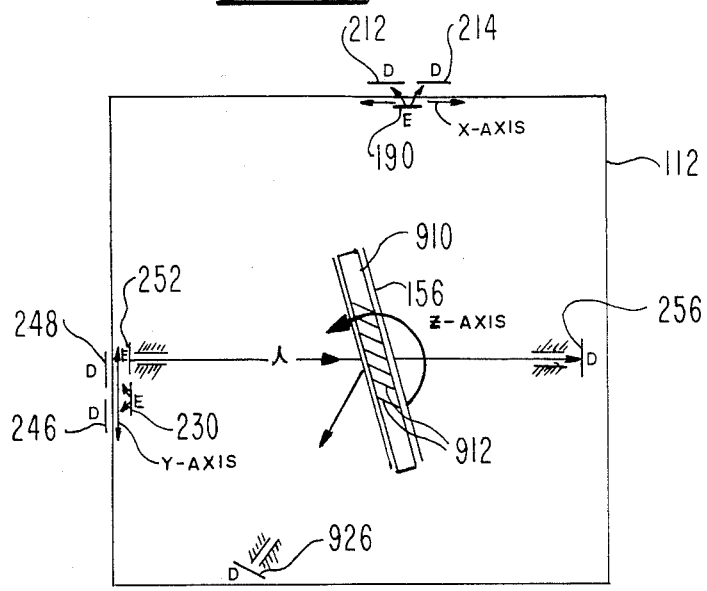
FIG. 29 is a diagrammatic plan illustration of light paths and detection of the arrangement of FIGS. 26 and 27.

A variation of the Z axis detecting facility is illustrated in FIGS. 26 and 27 wherein a comb 910 having depending teeth 912 is suitably mounted within a lower extending recess of the guillotine member 156 for rotation therewith but being slidable in a vertical direction relative thereto to thus maintain the comb 910 in a lowered position. Also the variation of FIGS. 26 and 27 includes a return spring 914 for returning the pin 144 and comb 910 to a center rotative position. As shown in FIG. 29, the comb 910 and its teeth 912, which are formed from a clear plastic, will transmit a portion of light to the light sensor 256. Rotation of the comb 910 with its teeth 912 varies the intensity of the light passed to the detector 256. As shown in FIG. 28, the detector 256 is connected to a voltage change sensing circuit containing operational amplifiers 916 and 918 which are substantially similar to the operational amplifiers 324 and 330 described in FIG. 13. The voltage changes which appear as pulses on the output of amplifier 916 are detected by a comparator 920 to signal changes in the comb angle and operation of the guillotine. An analog to digital converter 922 is connected to the output of the amplifier 918 for producing a digital signal which corresponds to the angle of rotation of the comb 910. Additionally there is provided pulsing circuit 924 for the diode 252 which is utilized to distinguish a large angle turn of the comb compared to operation of the guillotine since some light will pass through the comb whereas the guillotine will substantially block all of the light.

In order to make a rotational selection option that is digital or a switch action which may be used in addition or substitution for depression of the finger element, a further light sensor 926 is mounted on the front wall of the housing 112 to receive light when the comb 912 is at a selected angle. The reflected light will only impinge upon the light sensor 926 when the comb 910 has an angle which is close to this selected angle. The response of light sensor 926 can be used as a switch such as to control the previously described cursor moving modes. Additional angle selecting sensors may be provided for providing angle selection in addition to the single angle selection provided for the sensor 926.

Another variation of a computer control unit in accordance with the invention is shown in FIGS. 30 and 31. The unit contains a box-like housing 1002 with a movable carriage 1004 contained therein for sliding movement over a square area of the bottom of the housing 1002. A square plate 1006 is attached to the top of the carriage 1004 with front and back edges of the plate 1006 slidably engaged within a rectangular frame 1008 which at its longitudinal ends is slidably retained against respective side walls 1010 and 1012 of the housing 1002. The edges of the carriage 1004 overlap the bottom surfaces of the frame 1008 and a upper plate 1014, fastened on top of the plate 1006 has edges overlapping the upper surface of the frame 1008 to retain the plate 1006 within the plane of the frame 1008. An operating pin 1016 is fastened at its lower end in the plate 1006 and extends upward through an opening 1018 in a cover 1020 of the housing 1002 as well as through the opening 62 in the keyboard cover 64. A cover plate 1022 having a finger engaging knob 1024 is fastened on the top of the pin 1016 so as to cover the opening 62 and prevent objects and material from falling into the control.

An operator by engaging the finger member 1024 can move the carriage 1004 in two dimensions over the bottom of the housing 1002. In one contemplated embodiment, a square frame member 1026 is suspended at its corners by springs 1028, 1029, 1030, 1031 to corners of the housing 1002 above the plate 1014 and the lower members 1008 and 1006. If it is desired to utilize a centering spring return on the assembly, a collar member shown in dashed lines 1034 is inserted through the opening 108 over the upward flange 1015 of the plate 1014 to fit within the center opening of the frame 1026 to thus fix the carriage unit 1004 to the spring-biased frame 1026 and provide for a centering spring return for the control.

Figure 32:
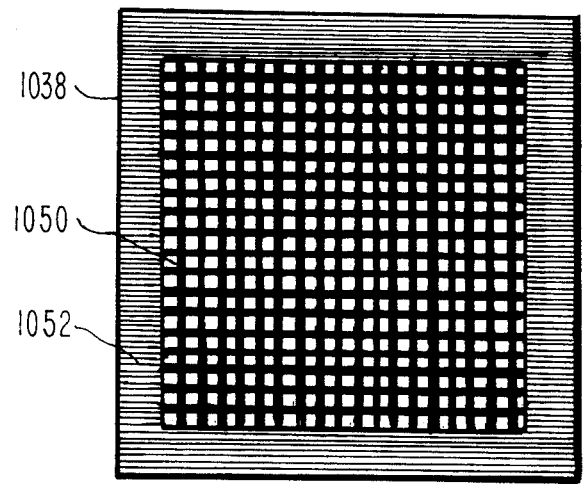
FIG. 32 is a grid pattern sheet utilized in the position indicating device of FIGS. 30 and 31.

The carriage 1004 has a mirror surface 1036 formed on an upper wall thereof and has a pattern sheet or layer 1038 on the lower surface thereof. A moire pattern sheet 1040 is mounted on the bottom of the housing 1002 extending over a light admitting opening 1042 and four light exit openings 1044, 1045, 1046 and 1047, FIG. 33, disposed on the four sides of the opening 1042. As shown in FIG. 32, the pattern 1038 includes a central grid pattern 1050 surrounded by a opaque or black border 1052. The grid pattern defines evenly spaced openings which are separated by opaque areas having the same width of the openings. The moire pattern 1090 is transparent in the middle for passing light from the opening 1042 and on the four sides thereof over the respective openings 1044, 1045, 1046 and 1047 has respective striped patterns 1054, 1055, 1056 and 1057. The stripe patterns 1054 and 1056 extend parallel to the Y direction of the grid pattern 1050 while the stripes 1055 and 1057 extend parallel to the X direction of the grid pattern 1050. The alternating dark and light regions of the stripe areas 1054, 1055, 1056 and 1057 have the same width as the dark and light regions of the grid pattern 1050, however, the patterns 1054 and 1055 are off-set with respect to the respective opposite patterns 1056 and 1057 by one-fourth of a cycle wherein a cycle is defined as the length of one light region plus one dark region. A light source 1060 is positioned beneath the opening 1042, FIG. 31, while the light sensors 212, 214, 246 and 248 of the previously described circuitry is positioned for receiving light passing through the openings 1044, 1046, 1045 and 1047, respectively. The control device of FIGS. 30 and 31 can thus be utilized to control a cursor in accordance with the invention.

Figure 33:
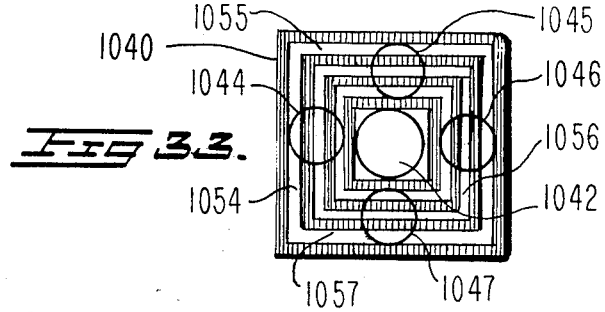
FIG. 33 is a plan view of moire pattern and detector arrangement for sensing the movement of the pattern of FIG. 32.
Figure 34:
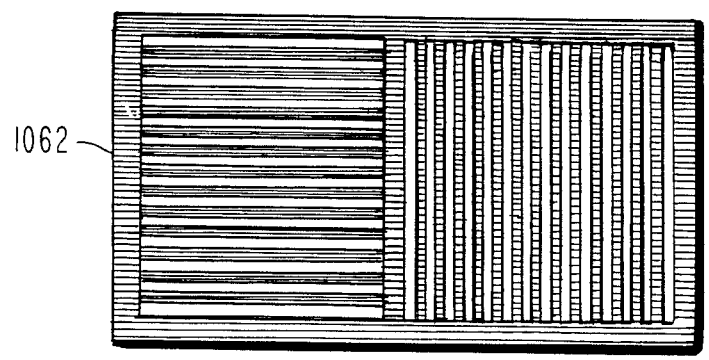
FIG. 34 is a plan view of an modified grating pattern arrangement for being employed in the movement sensor of FIGS. 30 and 31.
Figure 35:
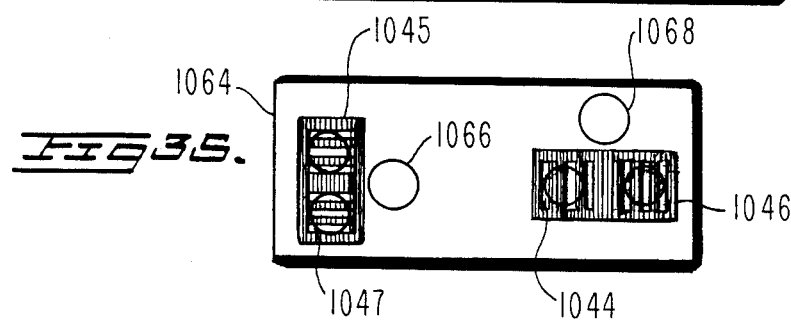
FIG. 35 is a plan view of a moire pattern and detector arrangement for use with the grating patterns of FIG. 25.

An alternative pattern 1062 is shown in FIG. 34 which can be used in place of the pattern 1038 of FIG. 32, and an alternative moire pattern 1064 in FIG. 35 which may be used in place of the moire pattern 1040 of FIG. 33. The pattern 1062 utilizes two regions of corresponding stripe patterns in the X and Y directions in place of a single grid pattern. The moire pattern correspondingly utilizes the X and Y sensing patterns in positions for sensing the respective X and Y gratings of FIGS. 34. Corresponding resposition of the openings 1045, 1047, 1044 and 1046 is also made and pairs of openings for light sources 1066 and 1068 replace the single opening 1042. The patterns of FIGS. 34 and 35 have the advantage that light through the openings 1066 and 1068 is attenuated less passing through the grating patterns 1062 since the openings in the respective X pattern and Y patterns only attenuate the light by 50% whereas the pattern 1036 of FIG. 32 attenuates the light by 75% during each pass through the pattern. Thus less intense light sources can be used and/or better gain can be achieved. Additionally the modulation of light passing to the X sensors while moving in the Y direction, and vice versa, is avoided in the patterns of FIGS. 34 and 35.

Figure 36:
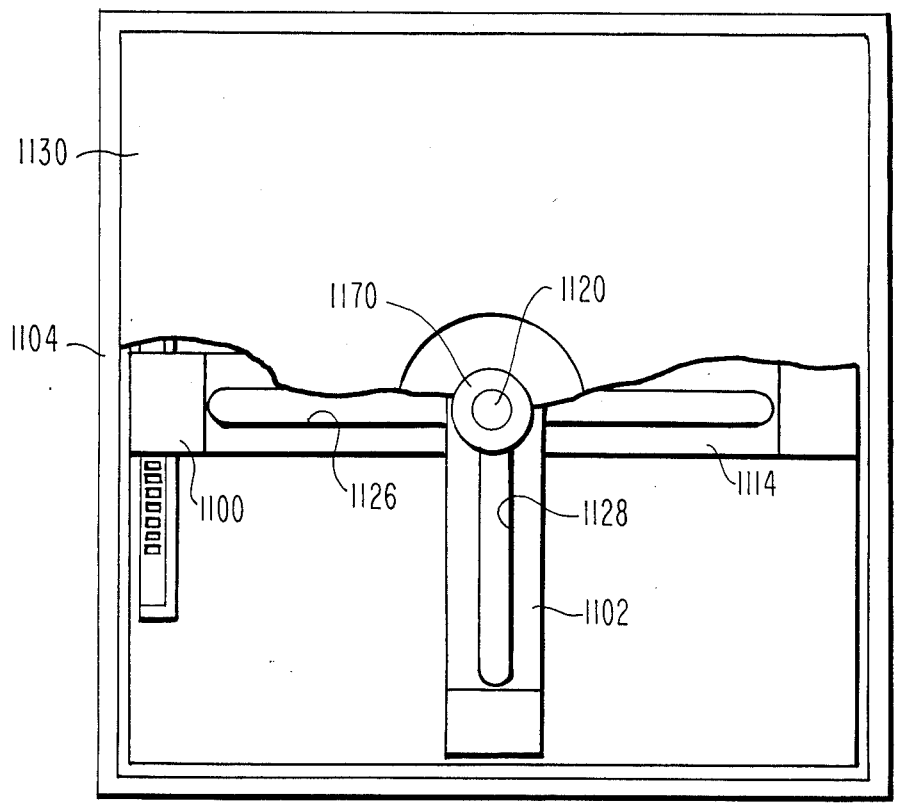
FIG. 36 is a top view with portions broken-away of a variation of the computer control device wherein a rotational or joystick member is employed to control the cursor position.
Figure 37:
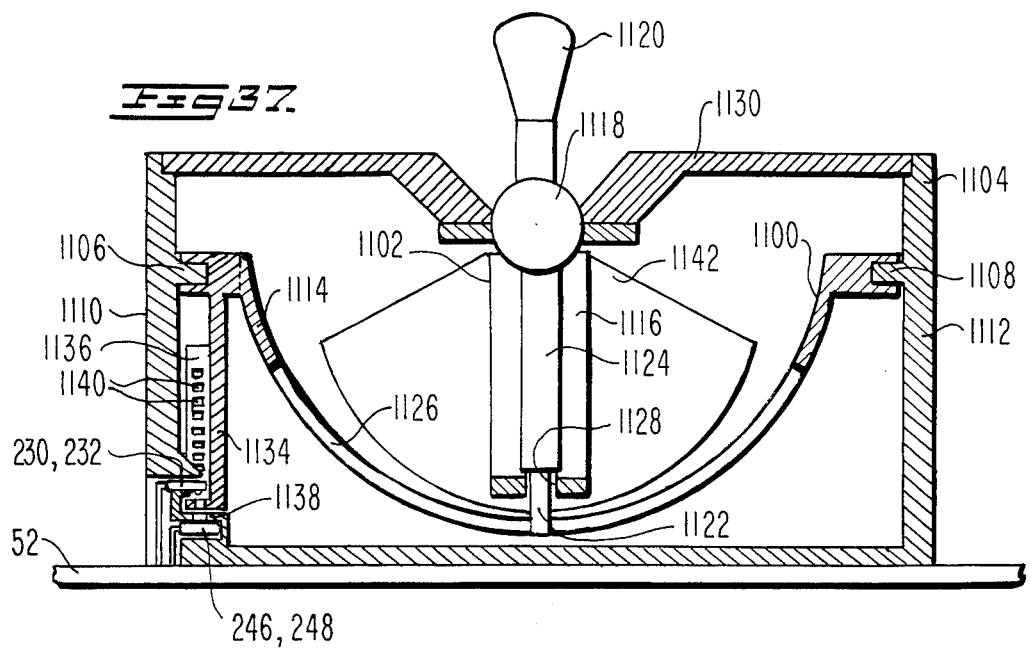
FIG. 37 is an elevational section view of the device of FIG. 36.

A joystick variation of the digital positioning control in accordance with the invention is illustrated in FIGS. 36 and 37 wherein respective X and Y position sensing members 1100 and 1102 are pivotally mounted on corresponding pairs of opposite walls of a housing 1104 such as illustrated for the Y position sensing member 1100 pivotally mounted upon pins 1106 and 1108 on respective walls 1110 and 1112. Elongated central portions 1114 and 1116 of the respective members 1100 and 1102 extend between the end pivots in circular arcs which have centers of curvature at the ball 1118 supporting the joystick handle 1120; the portion 1116 having a smaller radius of curvature than the portion 1114 so that the member 1116 is freely movable within the member 1114. A shank 1122 extending downward from the lower extending member 1124 of the joystick handle extends through slots 1126 and 1128 in the respective members 1114 and 1116 so that movement of the joystick handle 1120 results in corresponding pivoting of the respective members 1100 and 1102 with the pin 1122 freely sliding in the slots 1126 and 1128. The ball 1118 is suitably mounted in the cover 1130 of the housing 1104 for pivoting therein.

A sector member 1134 extends downwardly from one end portion of the member 1100 and has an arcuate flange portion 1136 which is disposed over a moire pattern portion 1138 in the housing so that openings 1140 forming a grating pattern on the flange 1136 pass over moire or quadature spaced openings in the moire pattern member 1138. The spacings of the openings in the member 1138 are similar to that in the inserts 202 and 236 of FIG. 3. The light-emitting diodes 230 and 232 and the light sensors 246 and 248 are suitably mounted for generating the quadature related signals utilizable for sensing the Y position.

The X position member 1102 contains a depending sector member 1142 which is substantially similar to the sector 1134 with corresponding grating flange and moire pattern sensing for the X direction sensing.

A joystick variation utilizing the position sensing techniques of the embodiment shown in FIGS. 30–33 is illustrated in FIG. 38 and includes a joystick handle 1150 which is mounted by a gimble 1152 on the top of a housing 1154. An inside extension 1156 of the joystick handle supports a member 1158 having an inside convex spherical mirror surface 1160, an outer convex surface 1162 with a grid pattern formed thereon similar to the pattern 1036 of FIG. 32. A concave moire pattern 1164 is disposed below the member 1158 for generating quadrature signals in a manner similar to that of the unit of FIGS. 30 and 31.

In a still further variation of the position sensor as shown in FIGS. 39–43, a pattern member 1202 is mounted for movement in two dimensions within a plane in which the sheet or plate-like member 1202 extends. An upward extending member 1204 may be engaged by fingers of an operator to move the member 1202. A light source 1206 extends over the member 1202 and a sensor array 1208 is mounted beneath the layer 1202 for receiving light passing through the member 1202. The light sensing member 1208 is connected to a processing circuit 1212 and includes a rectangular array of light sensing elements 1214 which produce signals which can be sensed by the processing circuit 1212 to indicate the intensity of light impinging upon the respective elements 1214. Alternatively the finger-engageable member can be suitably coupled to the array unit 1208 to move the light sensing elements relative to the pattern member 1202.

The member 1202 as shown in FIGS. 40 and 42 is generally transparent with a pattern of gray spots formed thereon with a coding in accordance with the position of the spots on the member 1202. In an example of one particular coding, there is shown a group 1218 of four spots 1220, 1222, 1224 and 1226 which have selected shades of gray. Adjoining groups of spots such as the group 1230 define a different position by having a combination of different gray levels. Dark regions 1234 are formed on the pattern for being used as reference points and may be used to determine the rotative position of the member 1202. The spots 1220, 1222, 1224 and 1226 have one of four selected gray levels which can be recognized by the sensor 1208 and processing circuit 1212. A group of eight spots can have 65,536 different codes which means that the member 1202 can have a square array of coded areas which is 256×256. The array sensor 1208 by sensing the code of the area most centrally positioned relative thereto can thus accurately determine the position of the member 1202. This information may then be utilized to operate a computer such as controlling the cursor movement thereof.

The arrangement of FIGS. 39-43 can also be used to determine depression of the finger element in addition to X, Y and rotative positions. The member 1202 is mounted for limited downward movement against a spring (not shown) bias. The normal height of the pattern member 1202 above the sensor array produces a selected sharpness in the pattern projected on the array sensor. Due to light dispersion from the source 1206, the size of the spots, or umbra, projected on the sensor array 1208 will vary inversely in accordance with the distance of the pattern member 1202 from the array sensor 1208. A change in umbra size can be detected to determine depression of the finger element 1204. It is noted that the positions of the light source 1206 and the sensor array 1208 can be reversed to thus have the member 1202 in a normal raised position in close proximity to the array for X, Y and rotative position sensing.

A variation of the computer control procedure of FIG. 14 is shown in FIG. 44 for providing selective rapid and slow cursor positioning control by switch operation, such as depression of cap 70. In first step 1250 the position data is read and the program proceeds to step 1252 where the presence of a X-edge signal (X min or X max) is determined. If there is no X-edge signal, then the program proceeds to step 1254 where any change in the X data signals AX and BX is determined. When a change is uncovered in X data signals, the program in step 1256 selects step 1258 or 1260 depending upon whether the switch is operated or not, respectively. In step 1258, selected when the button 70 is depressed, the X-count is updated by adding or subtracting ten from the X-count, while in step 1260 selected when button 70 is not depressed, the X-count is changed only by one. Either Table I or II is used to determine where the count is changed up or down, or not changed.

In the event that the finger element is in a minimum or maximum X position in step 1252, the program branches to step 1262 where a switch operation results in selection of step 1264. The X-count is incremented or decremented in step 1264 depending upon whether the X max or X min signal is present. From step 1260, step 1258, step 1262 if false, or step 1264, the program proceeds to step 1266 where the X-count is compared with minimum and maximum limits, or an overflow is detected, to branch to step 1268 where the X-count will be set to the corresponding limit. From step 1254 if false, from step 1266 if false or from step 1268, the program advances to step 1270 where there is performed a Y-axis count procedure which has steps substantially similar to the steps in the dashed box 1272 for the X-axis count procedure except that the steps relate to the Y-edge, AY and BY signals and the Y-count. In the next step 1274 the cursor is moved to the position corresponding to the X and Y counts.

After clearing the interrupt in step 1276, the program proceeds to step 1278 where the presence of an edge signal X min, X max, Y min or Y max results in step 1280 where the sensing of a switch depression cause a delay in step 1282 and a jump back to step 1250. The program exits at 1284 the procedure of FIG. 44 if step 1278 or step 1280 are false.

Referring to FIG. 45, the cursor movement produced by the procedure of FIG. 44 is illustrated. When the switch 70 is not depressed, movement of the cursor 310 is limited to a small area 1290 which is only a small portion of the area of the display on the monitor 312. This area may be defined, for example by 100×100 points corresponding 1 to 1 to movement of the finger element. When the finger control 60 is not at an edge of its area of movement, depression of the button 70 and movement of the finger element results in movement of the cursor by increments of 10 so that the cursor can be moved within a much larger area 1000×1000 points or within the area of the whole display; if necessary, the material displayed on the screen of the monitor may be correspondingly changed. When the control element 60 reaches a maximum or minimum X or Y position, then cursor movement will be stopped until or unless the switch button 70 is depressed. Then the movement of the cursor will be by a rate method resulting in shifting of the area 1290 in the direction of the corresponding edge or edges, such as illustrated by the arrow 1292 and the new small shifted area 1294 in which the cursor can now be moved when the button is released.

The employment of the button 70 to select rapid and slow modes, or coarse and fine modes, of cursor positioning results in substantially improved and easier control of cursor positioning.

Since many modifications, variations and changes in detail may be made to the above described embodiments without departing from the scope and spirit of the invention, it is intended that all matter described above and shown in the accompanying drawings be interpreted as illustrative and not in a limiting sense.

What is claimed is:

1. A computer control comprising
   a housing,
   a finger element extending above the housing and adapted to be gripped and moved by fingers in at least two dimensions to selected positions,
   a pair of movable members mounted in the housing and coupled to the finger element for movement in respective orthogonal directions in response to corresponding movement of the finger element,
   each of said pair of movable members including a light control grating defining alternating light and dark patterns along the corresponding direction of movement,
   light emitting means and light responsive means disposed alongside each of the respective light control gratings for responding to light changes due to movement of each respective grating relative thereto wherein each light responsive means generates a pair of signals having opposite quadrature related phases for indicating motion in respective plus and minus directions of movement, and
   means responsive to the pairs of signals for providing digital data corresponding to the two dimensional position of the control member.

2. A control as claimed in claim 1 wherein the pair of movable members includes respective upper and lower plates which are slidable in respective orthogonal directions along their planes and which have respective slots extending orthogonal to the respective directions of movement of the plates, the finger element includes a stem extending through the slots of the respective plates and the housing includes means retaining the plates such that the plates are only movable in their corresponding directions of movement, the stem being slidable within the slot of the corresponding member when the movement is in the orthogonal direction.

3. A control as claimed in claim 2 wherein the plates are elongated in respective dimensions perpendicular to the directions of movement of the respective plates, and the plate retaining means includes wall means of the housing for slidingly engaging opposite ends of the plates to retain the plate means.

4. A control as claimed in claim 3 where the plates have respective perpendicular extensions on the opposite ends thereof for preventing twisting and binding thereof when sliding along the respective wall means.

5. A control as claimed in claim 3 wherein the plates have respective head portions at one ends thereof such that the head portions define respective head walls extending perpendicular to the longitudinal dimension of the respective plates and along the directions of movement thereof, the grating means being formed in the respective head walls.

6. A control as claimed in claim 5 wherein the head portions also define respective head grooves extending on the sides of the head walls adjacent the plates; the gratings are formed by a pair of series of grating slots formed through the respective head walls wherein each grating slot extends perpendicular to the respective directions of movement and each series of grating slots extends along the direction of movement; the light emitting means includes respective pairs of light emitting diodes mounted in the housing and extending in the respective head grooves for directing light toward the head walls; the housing wall means includes a pair of housing wall recesses formed in the wall means alongside the respective head wall means; and the light responsive means includes respective masks secured in the respective housing wall recesses, each mask includes a pair of mask slots aligned with the series of grating slots in the respective head wall, each of the mask slots extending perpendicularly to the direction of movement of the respective head wall, pairs of semiconductor light sensing elements mounted in the respective housing wall recess for sensing light passing through the respective mask slots, and each pair of mask slots having a spacing therebetween selected to produce the respective pair of signals with quadrature related phases.

7. A control as claimed in claim 6 wherein the mask slots have a length which differs substantially from the lenth of grating slots with the shorter slots being centered relative to the longer slots so slight transverse movements of the head portions relative to their directions of movement do not cause modulation of light passing through the grating slots and the mask slots.

8. A control as claimed in claim 1, wherein the finger element is pivotally mounted in the top of the housing by a ball joint and has a stem extending downward in the housing; the pair of movable members are pivotally mounted in the housing for pivoting about respective orthogonal axes and each of the movable members includes an arcuate portion formed coaxial with the ball joint and including a slot in the arcuate portion co-planar with each respective member pivot axis for receiving the stem to couple the finger element to each movable member, and a sector portion with an apex on the respective member pivot axis and extending in a plane perpendicular to the member pivot axis wherein the respective grating is formed arcuately on each sector portion.

9. A control as claimed in claim 8 wherein the respective gratings are formed on arcuate flanges formed perpendicularly on the sectors.

10. A computer control as defined in claim 1 wherein the housing is adapted for being mounted underneath a cover of a keyboard, the finger element is adapted for extending upward through an opening in the cover of the keyboard, the finger element is movable within a plane extending parallel to the keyboard cover, and there is included a plate mounted over the housing for movement with the finger element and for extending relative to the opening in the computer keyboard cover for closing the opening.

11. A computer control as claimed in claim 1 including spring means for urging the finger element to a centered position relative to the movement in the two dimensions.

12. A computer control as claimed in claim 11 wherein the two dimensional movement of the finger element defines a rectangular area, and the spring means includes four springs extending diagonally in alignment with the four corners of the rectangular area so as to bias the finger element in a centered position.

13. a computer control as defined in claim 12 wherein the housing includes a top having a rectangular opening through which the finger element extends, there is included a collar on the finger element, and the four springs are tension springs mounted at one ends to the top at the respective corners of the rectangular opening and at the other ends to the collar.

14. A computer control as claimed in claim 1 wherein the upward extending finger element includes means extending into the housing for moving vertically relative thereto, means biasing the vertically movable means to an upward position, and means for detecting the downward vertical movement of the vertically movable means.

15. A computer control as claimed in claim 14 wherein the finger element includes a tubular member for movement in at least two dimensions, the vertically movable means includes a pin extending through the tubular member, the biasing means includes a spring biasing the pin upward, a vertically slidable cap secured over the upper end of the tubular member for engaging and moving the pin downward, a switch member mounted on the lower end of the pin member for movement therewith, and light sensing means for detecting the lower position of the switch member withn the housing for indicating depression of the cap.

16. A computer control as claimed in claim 1 including friction means for retarding movement of the finger element in one of the directions of movement thereof while permitting relatively free movement in another direction.

17. A computer control as claimed in claim 15 wherein the housing and the switch member include means for restricting movement of the switch member to movement in one of two orthogonal directions of movement of the finger element, the switch member includes a switch member slot for receiving the pin member and the pin member includes tab means for securing the pin member along the bottom side of the switch member at the switch member slot whereby the spring bias of the pin causes frictional engagement of the pin member tab means with the switch member to retard movement of the finger element along the switch member slot while the cap is not depressed.

18. A computer control as claimed in claim 17 including a second spring extending between the cap and the tubular member and biasing the cap upward whereby the spring force producing frictional resistance against movement of the finger element is less than the force required to depress the spring.

19. A computer control as claimed in claim 1 wherein the finger element includes means extending into the housing for rotating relative thereto, and there is included a means within the housing for determining the rotation thereof to provide an additional computer control signal.

20. A computer control as claimed in claim 19 wherein the rotating means includes a disc within the housing, disc grating means defining alternating dark and light areas on the disc means, and light responsive means for sensing movement of the disc grating means to generating a pair of quadrature related signals indicating movement of the disc grating means in response to rotation of the finger element.

21. A computer control as claimed in claim 19 wherein the rotating means includes a comb extending within the housing for being rotated to different positions, light means for generating light to pass through the comb and to be attenuated by the relative rotative positions of the comb, light detecting means, and analog to digital converting means for responding to the light detecting means to generate binary signals indicative of the rotative position of the control member.

22. A computer control as claimed in claim 1 wherein the gratings are formed by a pair of series of grating slots formed in the respective movable members wherein each series extends along central portions of one dimensions of the movable members leaving light blocking end portions at ends of the series of slots; the light responsive means includes a pair of masks mounted in the housing adjacent the respective gratings and having that light passing through the gratings and the mask openings modulated by movement of the gratings, and light sensing means mounted in the housing for receiving the modulated light to produce the pairs of signals with quadrature related phases; said masks and gratings are such that light passing through the gratings and the mask spring means and impinging on the light sensing means has at least a predetermined intensity but when said light blocking end portions are disposed over the mask opening means the light impinging on the light sensing means is reduced substantially below the predetermined intensity; and means responsive to the light sensing means for producing digital edge signals indicative of the finger element reaching an edge of travel.

23. A computer control comprising
a computer keyboard having a plurality of data entry keys in a planar arrangement defining a key plane,
a control device housing mounted in the keyboard below the key plane,
pattern means slidably mounted in the control device housing for movement in at least two orthogonal directions parallel to the key plane wherein the pattern means defines respective light control patterns extending in each of the two orthogonal directions,
a finger-grippable control element coupled to the pattern means and extending upward from the housing in the key plane for movement in two dimensions in the key plane to selectively move the pattern means to selected positions in its orthogonal directions of movement, and light responsive means for responding to the light control patterns of the pattern means to generate signals indicative of the selected positions of the pattern, means in the respective orthogonal directions.

24. A computer control as claimed in claim 23 wherein the pattern means includes a pair of movable members mounted in the control device housing and coupled to the finger element for independent movement in respective orthogonal directions in response to corresponding movement of the finger element, each of said pair of movable members including a light control grating forming the respective light control patterns extending in each of the two orthogonal directions.

25. A computer control as claimed in claim 23 wherein the pattern means includes a carriage mounted in the control device housing for two dimension movement wherein the light control patterns are planarly disposed on the carriage.

26. A computer control as claimed in claim 25 wherein the light control patterns include respective grids.

27. A computer control as claimed in claim 25 wherein the light control patterns include a rectangular array of patterns wherein each pattern contains a plurality of regions with selected gray levels such that the combination of gray levels of the regions in each pattern are different from every other pattern.

28. A computer control as claimed in claim 23 wherein the computer keyboard includes a cover having an opening over the control device housing with the finger element extending upward through the opening, is finger element including a plate therein closing the opening in the cover.

29. A compurer control as claimed in claim 28 wherein the plate is slidable on the housing with the finger element being slidable therewith.

30. A computer cursor control as claimed in claim 23 including spring means for urging the finger element to a centered position relative to the movement in the two dimensions.

31. A computer control as claimed in claim 30 wherein the two dimensional movement of the finger element defines a rectangular area, and the spring means includes four springs extending diagonally in alignment with the four corners of the rectangular area so as to bias the finger element in a centered position.

32. A computer control as claimed in claim 23 wherein the finger element includes a tubular member for movement in at least two dimensions, the vertically movable means includes a pin extending through the tubular member, the biasing means includes a spring biasing the pin upward, a vertically slidable cap secured over the upper end of the tubular member for engagnng and moving the pin downward, a switch member mounted on the lower end of the pin member for movement therewith, and light sensing means for detecting the lower position of the switch member within the housing for indicating depression of the cap.

33. A computer control as claimed in claim 23 including friction means for retarding movement of the finger element in one of the directions of movement thereof while permitting relatively free movement in another direction.

34. A computer control as claimed in claim 1 wherein the finger element includes means extending into the housing for rotating relative thereto, and there is included a means within the housing for determining the rotation thereof to provide an additional computer control signal.

35. A computer control comprising
a stationary mask defining light transmissive opening means for passing light therethrough,
a movable member having a light control grating for moving across the mask opening means to modulate light passing through the grating and the mask opening means,
light emitting means and light detector means disposed upon respective opposite sides of the mask and grating such that the detector means generates an electrical detector signal which varies in accordance with light passing through the mask opening means and grating,
said mask and grating being such that light passing through the mask opening means and grating and impinging on the detector means has at least a predetermined intensity,
said movable member including an opaque end region at one end of the light control grating such that when the end region is over the mask opening the light intensity impinging on the detector means is reduced to less than the predetermined intensity to produce a corresponding change in the electrical signal from the detector,
means responsive to the detector signal for producing position changing control signals when the detector signal corresponds to light intensity above the predetermined intensity, and
means for producing edge control signals when the detector signal corresponds to light intensity below the predetermined intensity.

36. A computer control as claimed in claim 35 wherein the edge control signal producing means includes comparator means responsive to the detector signal being below a predetermined voltage for producing the edge control signal.

37. A computer control as claimed in claim 35 the means for producing position changing control signals includes means for producing a change signal indicative of changes in the detector signal, and hysteresis trigger means responsive to the change signal for producing a binary signal corresponding to movement of the grating; and the edge control signal means includes means for pulsing the light emitting means, and comparator means for detecting an absence of a change signal to produce the edge control signal.

38. A computer control comprising
a housing,
pattern means mounted in the control device housing for movement in at least two orthogonal directions wherein the pattern means defines respective light control patterns in each of the two orthogonal directions,
a finger-grippable control element coupled to the pattern means and extending upward from the housing for movement in two dimensions to selectively move the pattern means to selected positions in its orthogonal directions of movement,
light responsive means for responding to the light control patterns of the pattern means to generate signals indicative of the selected positions of the pattern means in the respective orthogonal directions, and
friction means associated with the finger element and pattern means for producing a retarding force to movement in one of the orthogonal directions substantially greater than a retarding force in the other direction.

39. A computer control as claimed in claim 38 wherein the signals for the light responsive means are adapted for use in controlling movement of a marker on vertical rectangular display of a computer monitor, and forward and backward movement in the one direction corresponds to up and down movement of the marker on the display.

40. A computer control comprising
grating means movable in at least one direction wherein the grating means defines alternating light and dark patterns extending across the direction of movement,
a stationary mask having a pair of spaced light transmissive slots disposed adjacent the grating means so that light passing through the slots is modulated by movement of the grating means,
a pair of light sensing elements aligned with the respective pair of slots for producing a pair of sensor signals corresponding to the intensity of light passing through the grating means and the respective slots,
said slots and grating means being such that the pair of sensor signals have opposite quadrature related phases corresponding to movement of the grating means in the respective opposite directions along the one direction of movement,
a pair of signal change means for generating respective change signals corresponding to changes in the sensor signals,
a pair of hysteresis trigger means for being operated by the respective change signals to produce square wave signals corresponding to the respective sensor signals, and
means responsive to the square wave signals for maintaining a count indicative of the position of the grating means.

41. A computer control as claimed in claim 40 wherein each of the pair of signal change means includes a differentiating circuit.

42. A computer control as claimed in claim 40 wherein each of the pair of signal change means includes an operational amplifier having one input connected to the output of the respective light sensing element, and integrating means connected from the output of the operational amplifier to the other input of the operational amplifier so that the output of the operational amplifier corresponds to changes in the sensor signals.

43. A computer control as claimed in claim 40 including end means at the opposite ends of the grating means for blocking light passage through a corresponding slot in the mask, a pair of means for generating corresponding edge signals in response to the corresponding sensor signals indicating the absence of light passage, means responsive to one of the edge signals for resetting the count to indicate a first edge position, and means responsive to the other edge signal for setting the count to indicate a second edge position.

44. A computer control as claimed in claim 43 wherein each of the pair of signal change means includes an operational amplifier having one input connected to the output of the respective light sensing element, nnd integration means connected from the output of the operational amplifier to the other input of the operational amplifier so that the output of the operational amplifier corresponds to changes in the sensor signals; and each of said resetting and setting means including comparator means connected to the output of the respective integration means for producing the respective edge signal.

45. A computer control as claimed in claim 43 includes light emitting means disposed on an opposite side of the grating means and the mask, and means for pulsing the light emitting means; and wherein said resetting and setting means are responsive to the respective signal change means indicating an absence of change signals during pulsing of the light emitting means for producing the respective edge signals.

46. A computer control comprising
grating means movable in at least one direction wherein the grating means defines alternating light and dark patterns extending across the direction of movement,
a stationary mask having a slot disposed adjacent the grating means so that light passing through the slot is modulated by movement of the grating means,
a light sensing element aligned with the slot and having a first resistance connected in series therewith to produce sensor signals corresponding to the intensity of light passing through the grating means and the slot,
said first resistance having a resistance value sufficiently high to produce a peak magnitude of sensor signal greater than a predetermined magnitude,
voltage responsive means for generating a pulse when a peak magnitude of the sensor signal exceeds the predetermined magnitude,
a counter for counting pulses from the voltage responsive means,
a plurality of resistance means controlled by outputs of the counter for selectively connecting adjustment resistances in parallel with the first resistance to reduce the magnitude of sensor signal to below the predetermined magnitude, and
means for converting the sensor signal to a binary signal useful in controlling a computer.

47. A computer control as claimed in claim 46 wherein the mask has a pair of spaced light transmitting slots disposed adjacent the grating means so that light passing through the slots is modulated by movement of the grating means; and there is included
a pair of light sensing elements aligned with the respective pair of slots and having a pair of respective first resistances connected in series therewith to produce a pair of sensor signals,
said slots and grating means being such that the pair of sensor signals have opposite quadrature related phases corresponding to movement of the grating means in respective opposite directions,
said first resistances having a resistance value sufficiently high to produce peak magnitudes of the sensor signals greater than a predetermined magnitude,
a pair of voltage responsive means for generating respective pulses when the respective peak magnitudes of the sensor signals exceed the predetermined magnitude,
a pair of counters for counting the pulses from the respective voltage responsive means,
a pair of plurality of resistance means controlled by outputs of the respective counters for selectively connecting adjustment resistances in parallel with the respective first resistances to reduce the magnitudes of the sensor signals to below the predetermined magnitude,
a pair of Schmitt triggers for converting the respective sensor signals to binary signals, and
means including counting means responsive to the binary signals for maintaining a count indicative of the position of the grating means.

48. A computer control as claimed in claim 47 including end means at the opposite ends of the grating means for blocking light passage through a corresponding slot in the mask, a pair of means for generating corresponding edge signals in response to the corresponding sensor signals indicating the absence of light passage, means responsive to one of the edge signals for resetting te count to indicate a first edge position, and means responsive to the other edge signal for setting the count to indicate a second edge position.

49. A computer control comprising
a pattern member having a plurality of light control patterns arranged in a two dimensional array wherein each pattern includes a plurality of regions each having a predetermined gray level selected from a pluralilty of different gray levels and wherein the combination of gray levels formed by the plurality of regions of each pattern differs from all the other patterns so as to define a code identifying the position of each pattern in the two dimensional array,
light means for illuminating the pattern member,
a rectangular array of light sensing elements for detecting the gray levels of the plurality of regions of at least one pattern on the pattern member,
finger-engageable means for moving either the pattern member, the array of light or light sensing elements relative to the other, and
means for determining the coding thereof to indicate the position of the pattern member relative to the array of light sensing elements.

50. A computer control as claimed in claim 49 wherein the pattern member includes a plurality of spots spaced interstitually between the patterns for indicating pattern positions.

51. A computer control as claimed in claim 40 wherein the count maintaining means includes means for indicating whether the last change in the count was up or down; means responsive to a change in state of a single one of the pair of square wave signals indicating movement of the grating in the same direction corresponding to the last change in count for correspondingly incrementing or decrementing the count; and means responsive to a change in state of both square wave signals for incrementing or decrementing the count, opposite to the indicated last change.

52. A computer control as claimed in claim 41 wherein each differential circuit includes a series connected capacitance for differentiating the sensor signals.

53. A computer control comprising
a stationary mask having light transmissive opening means for passing light therethrough;
a movable member having a light control grating extending near to but in spaced relationship to the stationary mask for moving across the mask opening to modulate light passing through the grating and the mask opening means;
a single light detector element disposed upon one side of the grating and the mask opening means;
a pair of light emitting diodes disposed upon the other side of the grating and the mask opening means wherein the light emitting diodes are spaced in a direction parallel to control grating;

means for alternately energizing the light emitting diodes at a rate which is at least twice a normal maximum rate of movement of grating cycles past the mask opening means;

means connected to the light detector element and operated in timed relationship with the alternately energizing means for generating a pair of detector signals corresponding to light intensity received by the light detector element during energization of the respective pair of light emitting diodes;

said mask opening means, said grating, said light detector element and said pair of light emitting diodes being spaced and arranged relative to each other so the pair of detector signals have quadrature related phases; and means responsive to the pair of light detector signals for indicating a position of the grating relative to the mask to control a computer.

54. A computer control as claimed in claim 53 wherein the stationary mask is a molded plastic mask with a slot formed therein to form the mask opening means; and the movable member is a molded plastic member having a wall with the grating defined therein by a series of slots uniformly spaced along an axis parallel to a direction of movement of the member.

55. A computer control comprising a finger grippable element movable in two dimensions in a two dimensional area of element movement, computer means including a monitor having a two dimensional display on which a marker can be generated and moved within the two dimensions of the display, means operated by movement of the finger grippable element for moving the marker on the display in correspondence with the movement of the finger grippable element in at least two different modes of movement including a first mode wherein the marker on the display is moved a large increment for each predetermined increment of movement of the finger grippable element, and a second mode wherein the marker on the display is moved a small increment which is substantially less than the large increment for each predetermined increment of movement of the finger grippable element, and operator controlled switch means associated with the finger grippable element for operating the marker moving means selectively in the two different modes in correspondence with operation of the switch means.

56. A computer control as claimed in claim 55 wherein the second mode defines an area of marker movement on the display which in size is substantially less than the total area of the display.

57. A computer control as claimed in claim 56 including means for detecting when the finger element reaches an edge of movement thereof, and means responsive to the edge detecting means and switch means for shifting the area of marker movement in a direction corresponding to a detected edge of movement.

58. A computer control as claimed in claim 55 wherein the finger grippable element is movable within a two dimensional plane, and the marker moving means is operated by the two dimensional planar movement of the finger grippable element.

59. A computer control as claimed in claim 58 wherein the finger grippable element includes a depressable member for operating the switch means, and spring means for biasing the depressable member to a raised position on the finger grippable member.

60. A computer control as claimed in claim 58 wherein the finger grippable element includes plate means slidable in two dimensions in a horizontal plane, a tubular stem extending upward from plate means, a finger grippable cap mounted on the tubular stem for limited vertical sliding movement, spring means biasing the cap to a raised position, and pin means extending through the tubular stem for movement with the cap to operate the switch means.

61. A computer control comprising grating means movable in at least one direction wherein the grating means defines alternating light and dark patterns extending across the direction of movement, a stationary mask having a slot disposed adjacent the grating means so that light passing through the slot is modulated by movement of the grating means, a light sensing element aligned with the slot and having variable resistance means connected in series therewith to produce sensor signals corresponding to the intensity of light passing through the grating means and the slot, said variable resistance means having a high resistance value sufficiently high to produce a peak magnitude of sensor signal greater than a predetermined magnitude, voltage responsive means for generating a pulse when a peak magnitude of the sensor signal exceeds the predetermined magnitude, a counter for counting pulses from the voltage responsive means, means controlled by outputs of the counter for selectively adjusting the resistance means to reduce the magnitude of sensor signal to below the predetermined magnitude, and means for converting the sensor signal to a binary signal useful in controlling a computer.

62. A computer control having fine and coarse modes of marker positioning, comprising:

a finger grippable element movable in two dimensions in a two dimensional area of element movement;

computer means including a monitor having a two dimensional display area in which a marker can be generated and moved;

means operated by movement of the finger grippable element for moving the marker on the display in first and second modes of movement;

said marker moving means during the first mode of movement including means for moving the marker within a first area of marker movement about a current position of the marker in correspondence with movement of the finger grippable element within the area of element movement;

said first area of marker movement being only a portion of the two dimensional display area of the monitor;

said marker moving means during the second mode of movement including means for moving the marker within a second area of marker movement about a current position of the marker in correspondence with movement of the finger grippable element within the area of element movement; and said second area of marker movement being larger than the first area of marker movement such that the first and second modes of movement define respective fine and coarse modes of marker positioning.

63. A computer control as claimed in claim 62 including means for detecting when the finger element reaches an edge of the two dimensional area of element movement, and means responsive to the edge detecting means during the first mode for shifting the first area of marker movement in a direction corresponding to the detected edge of the two dimensional area of element movement.

64. A computer control as claimed in claim 62 wherein the marker moving means includes a housing, plate means slidably mounted in the housing for movement in two dimensions, means operatively connecting the finger grippable element to the plate means for moving the plate means in correspondence with movement of the finger grippable element, and light detecting means for determining the position of the plate means to generate signals to control the position of the marker on the display.

65. A computer control as claimed in claim 64 wherein the plate means includes a pair of plates slidable in the housing in respective orthogonal directions, and light control grating means on each of the pair of plates for defining respective alternating light patterns in the corresponding directions to operate the light detecting means.

66. A computer cursor control comprising:
a housing;
plate means slidably mounted in the housing;
said housing including means for retaining the plate means in the housing and for permitting sliding movement of the plate means in two dimensions relative to the housing;
a finger grippable element operatively connected with the plate means and extending upward from the housing for enabling an operator to grip the element and to move the element within a two dimensional area of movement to move the plate means correspondingly in the two dimensions;
position determining means including light modifying pattern means mounted on the plate means, and light emitting and detecting means mounted on housing for sensing movement of the plate means in the two dimensions to determine the position of the finger grippable element in the two dimensional area;
computer means including a monitor with a cursor; and
means responsive to the position determining means for positioning the cursor on the monitor display at a position corresponding to the position of the finger grippable element.

67. A computer cursor control as claimed in claim 66 wherein said plate means includes a pair of movable members having respective upper and lower plates slidably mounted in the housing and coupled to the finger element for movement in respective orthogonal directions in response to corresponding movement of the finger element, and said light modifying pattern means including a light control grating on each of the pair of movable members for defining alternating light and dark patterns along the corresponding direction of movement to operate the light emitting and detecting means.

68. A computer cursor control as claimed in claim 67 wherein the upper and lower plates have respective slots extending orthogonal to the respective directions of movement of the plates; the finger element includes a stem extending through the slots of the respective plates; the retaining means of the housing includes means for retaining the plates such that the plates are only movable in their corresponding directions of movement, the stem being slidable within the slot of the corresponding member when the movement is in the orthogonal direction thereto.

69. A computer cursor as claimed in claim 68 wherein the plates are elongated in respective dimensions perpendicular to the directions of movement of the respective plates, and the plate retaining means includes wall means of the housing for slidingly engaging opposite ends of the plates to retain the plate means.

70. A computer cursor control as claimed in claim 69 where the plates have respective perpendicular extensions on the opposite ends thereof for preventing twisting and binding thereof when sliding along the respective wall means.

71. A computer cursor control as claimed in claim 69 wherein the plates have respective head portions at one end thereof such that the head portions define respective head walls extending perpendicular to the longitudinal dimension of the respective plates and along the directions of movement thereof, the light control gratings being formed in the respective head walls.

72. A computer cursor control as claimed in claim 71 wherein the head portions also define respective head grooves extending on the sides of the head walls adjacent the plates; the housing wall means includes wall recesses formed in the wall means alongside the respective head walls; and the light emitting and detecting means includes respective pairs of light emitting diodes mounted in the housing and extending in the respective head grooves for directing light toward the head walls, respective masks secured in the respective housing wall recesses, each mask including a pair of mask slots aligned with the grating means in the respective head wall, each of the mask slots extending perpendicularly to the direction of movement of the respective head wall, pairs of semiconductor light sensing elements mounted in the respective housing wall recess for sensing light passing through the respective mask slots, and each pair of mask slots having a spacing therebetween selected to produce a respective pair of signals with quadrature related phases.

73. A computer cursor control as claimed in claim 66 wherein the light modifying pattern means includes a plurality of light control patterns arranged in a two dimensional array with each pattern including a plurality of regions each having a predetermined gray level selected from a plurality of different gray levels and with the combination of gray levels formed by the plurality of regions of each pattern differing from all the other patterns so as to define a code which identifies the pattern and its position in the two dimensional array; and the light emitting and detecting means includes a rectangular array of light sensing elements for detecting the gray levels of the plurality of regions of at least one pattern, and means for determining the coding thereof to indicate the position of the plate means relative to the housing.

* * * * *